United States Patent [19]

Sussman

[11] Patent Number: 4,961,158

[45] Date of Patent: Oct. 2, 1990

[54] PORTABLE TRANSACTION TRACKING DEVICE

[76] Inventor: Lester Sussman, 8315 N. Brook La., #401, Bethesda, Md. 20814

[21] Appl. No.: 274,766

[22] Filed: Nov. 22, 1988

[51] Int. Cl.[5] .......................... G06F 3/023; G06F 3/14
[52] U.S. Cl. ............................ 364/709.04; 364/710.04
[58] Field of Search ....................... 364/705.02, 705.06, 364/709.04, 710.04, 715.01

[56] References Cited

U.S. PATENT DOCUMENTS

| | | | |
|---|---|---|---|
| 4,164,038 | 8/1979 | Nachtigal | 364/705.06 |
| 4,277,837 | 7/1981 | Stuckert | 364/705.06 |
| 4,587,409 | 5/1986 | Nishimura et al. | 364/705.06 |
| 4,623,965 | 11/1986 | Wing | 364/705.02 |
| 4,634,845 | 1/1987 | Hale et al. | 364/705.06 |
| 4,833,632 | 5/1989 | Nishimura et al. | 364/709.04 |

Primary Examiner—Dale M. Shaw

[57] ABSTRACT

A portable transaction cost tracking device, whereby the user is able to define the transaction to be tracked. The transaction is defined by means of a description, a tracking code and cost data that has been incurred by the said transaction at a given date and time. The system provides the capabilities to enter, edit, recall and delete information required to track any user transaction. The device interacts with the user by means of system function keys on a keypad and system generated prompts by means of menus on the device's display unit. Transaction budget control is also built into the device and can be applied to any user defined transaction. The device is able to communicate electronically with an external computer in order to bi-directionally exchange transaction data.

7 Claims, 10 Drawing Sheets

| POINTER 1ST TASK | CLIENT CODE | CLIENT DESCRIPTION | POINTER NEXT CLIENT | POINTER PRVS CLIENT | CLIENT COST LIMIT |
|---|---|---|---|---|---|
| 19 | 20 | 21 | 22 | 23 | 24 |

FIG. 3a

| POINTER 1ST DATA | POINTER NEXT TASK | POINTER PRVS TASK | TASK CODE | TASK DESCRIPTION | COST TYPE | COST (PER ITEM) | TASK COST LIMIT |
|---|---|---|---|---|---|---|---|
| 25 | 26 | 27 | 28 | 29 | 30 | 31 | 32 |

FIG. 3b

| POINTER TASK DESC. | POINTER SAME TASK | POINTER NEXT DATE | POINTER PRVS DATE | DATE TIME | AMOUNT | QUANTITY |
|---|---|---|---|---|---|---|
| 33 | 34 | 35 | 36 | 37 | 38 | 39 |

FIG. 3c

| POINTER 1ST TASK | CLIENT CODE | CLIENT DESCRIPTION | POINTER NEXT CLIENT | POINTER PRVS CLIENT | CLIENT COST LIMIT |
|---|---|---|---|---|---|
| 19 | 20 | 21 | 22 | 23 | 24 |

FIG. 4a

| POINTER 1ST DATA | POINTER NEXT TASK | POINTER PRVS TASK | TASK CODE | TASK DESCRIPTION | COST TYPE | COST (PER HOUR) | TASK COST LIMIT |
|---|---|---|---|---|---|---|---|
| 25 | 26 | 27 | 28 | 29 | 30 | 31 | 32 |

FIG. 4b

| POINTER TASK DESC | POINTER SAME TASK | POINTER NEXT DATE | POINTER PRVS DATE | DATE TIME | AMOUNT | QUANTITY |
|---|---|---|---|---|---|---|
| 33 | 34 | 35 | 36 | 37 | 38 | 39 |

FIG. 4c

| POINTER 1ST DATA | POINTER NEXT TASK | POINTER PRVS TASK | TASK CODE | TASK DESCRIPTION | COST TYPE | COST (TOTAL) | TASK COST LIMIT |
|---|---|---|---|---|---|---|---|
| 25 | 26 | 27 | 28 | 29 | 30 | 31 | 32 |

FIG. 5a

| POINTER TASK DESC | POINTER SAME TASK | POINTER NEXT DATE | POINTER PRVS DATE | DATE TIME | AMOUNT | QUANTITY |
|---|---|---|---|---|---|---|
| 33 | 34 | 35 | 36 | 37 | 38 | 39 |

FIG. 5b

PORTABLE TRANSACTION TRACKING DEVICE

BACKGROUND OF THE INVENTION

This invention relates to a compact portable/handheld calculator/timepiece that is capable of storing, retrieving, editing, deleting and outputting of description numeric data, as well as arithmetically manipulating the numeric data, pertaining to sales or purchases of goods or services (transactions) of the user.

The present invention is primarily aimed at, but not limited to, users who wish to keep a record of, for example;

monthly consumer purchases (for example food, clothing, entertainment expenses, automotive maintenance costs, personal grooming costs, expenditure costs on gifts etc.);

professional people who bill clients by the hour, or some multiple of time thereof (for example consultants, lawyers, plumbers, mechanics, electricians etc.);

salespeople who sell goods or services at a fixed price per item/service (for example television sales executive selling advertising time, or a street vendor selling foodstuffs or consumer merchandise etc.) and purchasing agents who buy goods from single/multiple source/s based on cost by volume or per item. (for example a purchasing agent for a retail store, or a restaurateur purchasing supplies, or an antique dealer purchasing items for clients, etc.)

These few examples simply illustrate the versatility of the present invention and it is to be understood that the application of the present invention is not restricted to the said examples.

The present invention provides the means for the user to program the present invention's data entry descriptions (for example food, clothing, entertainment expenses, automotive maintenance costs, personal grooming costs, expenditure costs on gifts etc.) either by means of a remote computer (for example a personal computer) interfaced with the present invention and down loading the said data entry descriptions, or by means of a data entry system integrated into the present invention, for example a keypad. These data entry descriptions form tables in the present inventions memory.

If the present invention is to be programmed from a remote computer, only the data entry descriptions need to be programmed, whereas the functional capabilities (for example the means for facilitating data input, storing, retrieving, editing, deleting, outputting etc.) need not be programmed by the user, by means of the remote computer and downloaded into the present invention's program memory, because these functions are already stored in the present invention's program memory. The advantage of this method is that the user need not devise programs on the remote computer to execute the said functional capabilities, but the user need only be concerned with defining the required data entry descriptions that will be used to track the user's data. Thus the user of the present invention need only have minimal technical expertise to use the present invention.

The present invention stores the transaction description and numeric data physically separately in memory, but both sets of data are logically linked together by programmatic means. The advantage of this data storage technique, is that in a transaction environment, the transaction description data are fixed over a given period of time. However, what does vary over time, is the transaction numeric data (for example incurred costs and generated revenues). Therefore, to store the character data and numeric data physically together in the present invention's memory, would be a waste of memory by repeatedly storing redundant character data together with any newly inputted numeric data.

The present invention also enables the user to keep track of their transactions by billing time based on an hourly rate, or some multiple of time thereof. The present invention enables the user to keep track of billing for multiple clients, each of whom may have a different billing rate that is user definable; to temporally suspend the billing clock for non-billable interruptions and after the interruption to continue the billing clock; to track non-hourly billing costs (for example telephone calls made on the clients behalf, or goods purchased to fulfill a client task, etc.).

The accumulated transaction data has the means of being transferred to a remote computer via an electrical/optical interface integrated into the present invention.

The present invention enables the user to set a budget limit for a given transaction description. For every transaction of the given transaction description, the current invention automatically sums the related expenditure and notifies the use if the budget has been exceeded.

OBJECTIVES OF THE PRESENT INVENTION

Accordingly it is the object of the present invention to provide an improved portable electronic calculator timepiece with the facilities for tracking a variety of sales or purchases data (transaction data). The transaction data consist of a description of the transacted item or service, an associated quick reference code of the said description, the unit cost of the said item, a cost limit not to be exceeded for the item or service, the total cost of the transaction, the number of unit items or services that the total cost incorporates and the date and time at which the transaction was made. The present embodiment stores this data in memory resident tables.

It is a further object of the present invention to provide the means of defining a transaction Task Table in the present invention's memory. This said table contains the item description, the associated quick reference code, unit cost and cost limit.

It is a further object of the present invention to provide the means to store user entered transaction cost data in the transaction Task Data Table, that is logically linked, but separately stored from the Client Task Table in the present invention's memory. This said table stores the transacted item's total cost, the number of unit items transacted and the date and time at which the transaction was made.

It is a further object of the present invention to provide the means of enabling the user to set a cost limit for a specific transaction type, such that the present invention will notify the user if the said cost limit has been exceeded.

It is a further object of the present invention to provide the means of bi-directionally transferring transaction data between the present invention and a remote computer.

It is a further object of the present invention to provide the means of defining the transaction Task Table either by means of a data entry system incorporated into the present invention (for example a keypad), or by means of transferring the definitions for the Task Table from a remote computer, from which the embodiment then automatically constructs the required tables.

It is a further object of the present invention to provide the means of inputting, storing, editing, retrieving, deleting and outputting of transaction descriptions in the Task Table and transaction cost data in the Task Data Table, as well as the means of arithmetically manipulating the transaction cost data and displaying the results.

It is a further object of the present invention to provide the means of inputting and tracking transaction cost data by means of labelling the cost data to be inputted with a quick reference alphanumeric code, that links the entered transaction cost data with a transaction description that is already stored in the Task Table.

It is a further object of the present invention to provide the means to input and track transaction cost data by means of a date and time stamp, which is electronically tagged to the transaction cost data upon inputting of the said data into the present invention's memory.

It is a further object of the present invention to provide the means of retrieving, editing, deleting and outputting of the data previously stored in the Task Data Table by the following means;
(a) all transactions executed on a specified date,
(b) all transactions executed over a user specified period of time (week, month or between two specified dates),
(c) all transactions executed of a specific transaction description on a user specified date,
(d) all transactions execurted of a specific transaction description over a user specified period of time (week, month or between two specified dates).

It is a further object of the present invention to provide the means of performing arithmetic functions (for example addition, subtraction, multiplication and division by a constant value) on data stored in the Task Data Table by means of the said functions described in (a) through (d) and
(e) individual user specified datum stored in the Client Task Data Table.

It is a further object of the present invention to provide the means of actuating, recording and translating contiguous and or interruptably accumulated time spent on a variety of transactions, that are billed by means of an hourly rate and or some multiple of time thereof, and to store the said accumulated time in the Task Data Table. It is to be understood that this said means of recording transaction cost data, is merely a specialized application of the previously described transaction Task Table, that now includes the time billing rate, instead of the unit item. Furthermore, it is to be understood, that any previously described objective relating to the Task Data Table, is applicable to this said specialized application of the transaction Task Table.

It is a further object of the present invention to provide the means of inputting, storing, retrieving, editing, deleting and outputting of user specified date and time alarm information.

It is a further object of the present invention to provide the means of inputting, storing, retrieving, editing, deleting and outputting of user specified messages, that are not stored in the transaction Task Table, nor in the transaction Task Data Table. The user message function can be regarded as the said date and time alarm function with the alarm disabled. An example of such data would be client telephone numbers and or addresses.

Other objectives and further scope of applicability will become apparent from the detailed description given hereinafter. It should be understood that the detailed description and specific examples, are given by way of illustration only, since various changes and modifications within the spirit and scope of the invention will become apparent to those versed in the art from this detailed description.

BRIEF DESCRIPTION OF THE DRAWINGS

For further understanding the present invention and for further objects and advantages thereof, reference is now made to the following description taken in conjunction with the accompanying drawings showing an embodiment of the present invention, in which:

FIGS. 3a, 3b and 3c are block diagrams that illustrate the logical data structures of the various tables (Client Table, Task Table and Data Table respectively), that are used to implement the functions of the present invention for an application that includes a client and tasks that incorporate cost per items;

FIGS. 4a, 4b and 4c are block diagrams that illustrate the logical data structures of the various tables (Client Table, Task Table and Data Table respectively), that are used to implement the functions of the present invention for an application that includes a client and tasks that incorporate cost per hour;

FIGS. 5a and 5b are block diagrams that illustrate the logical data structures of the various tables (Task Table and Data Table respectively), that are used to implement the functions of the present invention for an application such that the user has no need for the Client Table, but tracks transactions by tasks alone;

DETAILED DESCRIPTION OF THE INVENTION

Figure 1:
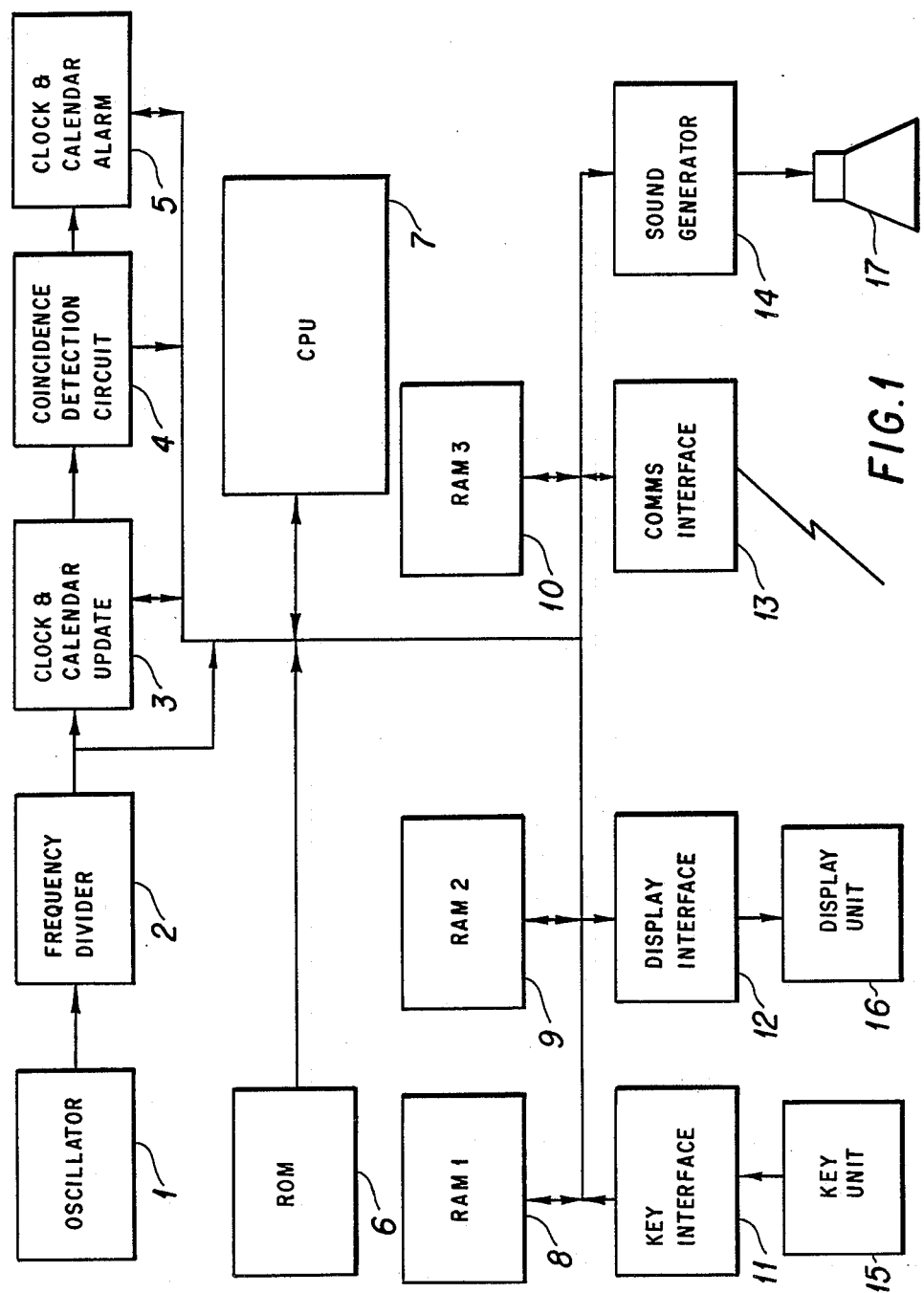
FIG. 1 is a block diagram of a principal circuit of an embodiment of the present invention.

FIG. 1 is a block diagram of a principal circuit for implementing the present invention. The circuit comprises of a circuit oscillator 1, a frequency divider 2, a time keeping counter with calendar functions 3, an alarm coincidence detection circuit 4, clock and calendar alarm memory 5, read only memory ROM 6, a controller CPU 7, random access memory RAM 8 through 10, a keypad interface circuits 11, a keypad unit 15, a display interface circuit 12, a display unit 16, a communications interface circuit 13, a sound generating circuit 14 and a speaker 17.

The oscillator circuit 1 is coupled to a crystal oscillator, that is not shown, for generating a time base signal in the form of clock pulses of the crystal oscillator's frequency (for example 32.768 kHz). The frequency divider 2 is responsive to the clock pulses for frequency dividing of the said frequency to a specific frequency that is applied to the controller CPU 7 and lastly divided to 1 Hz, which is applied to the time keeping counter 3.

The counter 3 provides the present invention with all time and calendar functionality. The 1 Hz frequency generated from the frequency divider 2, generates a signal to maintain the current time in seconds, minutes and hours, as well as current calendar data such as the day of the month and year. This horological data is available to the controller CPU 7 and to the display interface circuit 12.

The clock and calendar alarm circuit 5 contains the user defined alarm time and date information, which enters into the present invention by means of the keypad 15. The clock and calendar alarm circuit 5 has an associated coincidence detection circuit 4, which determines the equivalency between the alarm time and date stored in the clock and calendar alarm 5, and the current time and date as maintained in the clock and calendar update circuit 3. When an alarm equivalency is detected, the coincidence detection circuit 4 generates a clock and calendar alarm active signal, which is transmitted to the CPU 7.

ROM 6 contains all programs that the CPU 7 uses to interface with all of the present invention's circuit modules 1 through 6 and 8 through 17. ROM 6 also contains all the programs required to enter, store, retrieve, edit and delete all transactions in RAMs 8 through 10. ROM 6 also contains programs to send and receive transaction information between the present invention and a remote computer, via the communications interface 13 Furthermore ROM 6 also contains all non-volatile system messages, (for example, functional menus and error messages), that are to be displayed via the display interface circuit 12 and the display unit 16.

RAMs 8 through 10 may, or may not be a single RAM circuit. The reason as to why they are depicted in FIG. 1 as individual circuits, is to facilitate a better understanding of the description of the present invention's preferred embodiment of the different transaction tables as depicted in FIGS. 3a and 4a (RAM3 10 is the Client description Table); 3b, 4b and 5a (RAM2 9 is the Task description Table) and; 3c, 4c and 5b (RAM1 8 is the Data Table).

The keypad interface circuit 10 receives an output from a user selected key on the keypad 15, delivers its corresponding coded key output, senses the meaning of the key output and develops an output representative of its results, that is interpreted by the CPU 7.

The display interface 12 controls the display unit 16 by means of data received from the CPU 7. The display unit 16 could be any form of display that present technology avails, for example LCD or LED displays. Because of the relatively low power consumption of the present day LCD technology, this said form of display unit is used by way of preference in the embodiment of the present invention.

The communications interface 13 allows bi-directional transfer of information between the present invention and a remote computer (not shown). This said circuit establishes and breaks the communications link and maintains the integrity of the data transferred between the present invention and a remote computer. The technology used to implement the said circuit could be anything that current technology avails, for example RS-232C or GPIB interface protocols. The communication's interface 13 also facilitates the unidirectional transfer of data between the present invention's preferred embodiment and a remote printer.

Figure 2A:
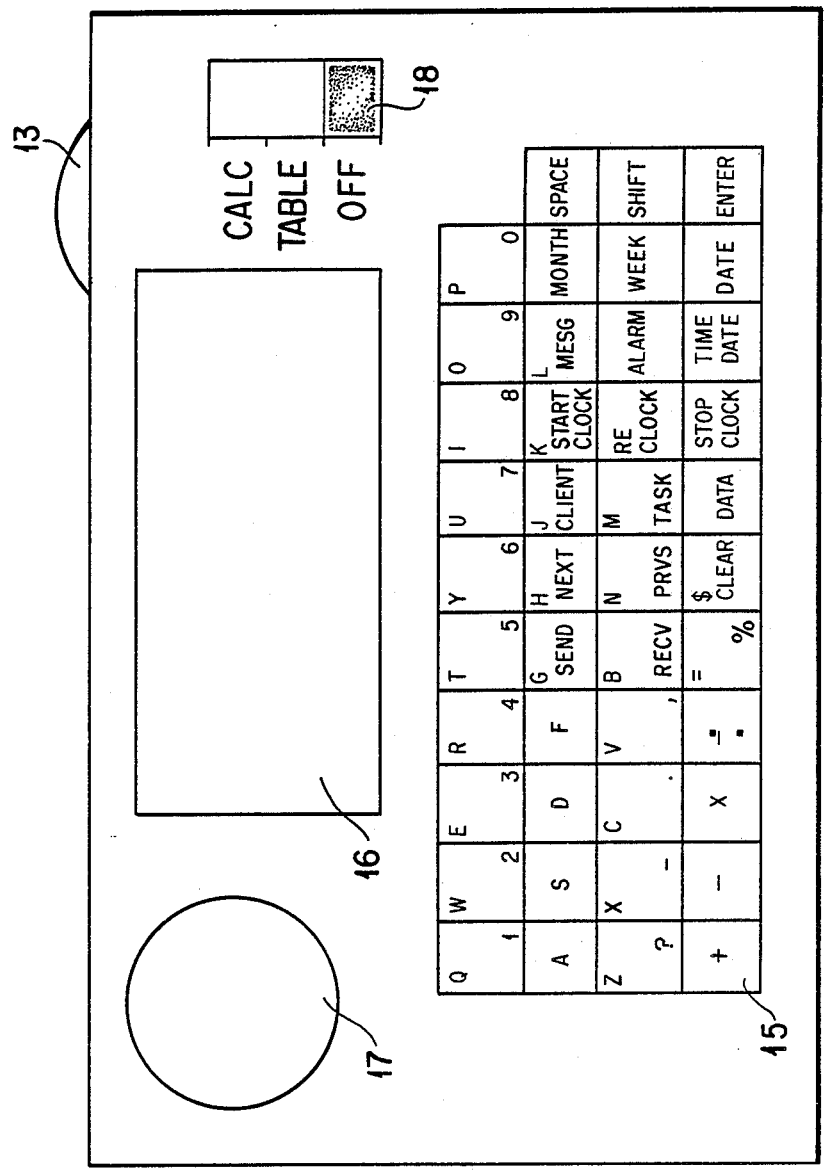
FIG. 2a is a plan view of the perspective of the illustrated embodiment.

FIG. 2a is a plan view showing the perspective of the illustrated embodiment, which includes the keypad 15, the display panel 16, the communications interface 13, the speaker 17 and in addition, a mode selector switch 18. The mode selector switch 18 enables the user to select either one of three modes; the OFF mode which disables all of the present invention's functionality, except for any set alarm conditions and stored information in the invention's memory; the TABLE mode, which enables the user to manipulate transaction information with the said invention; and lastly the CALC mode, which enables the user to use the present invention as a normal calculator.

Figure 2B:
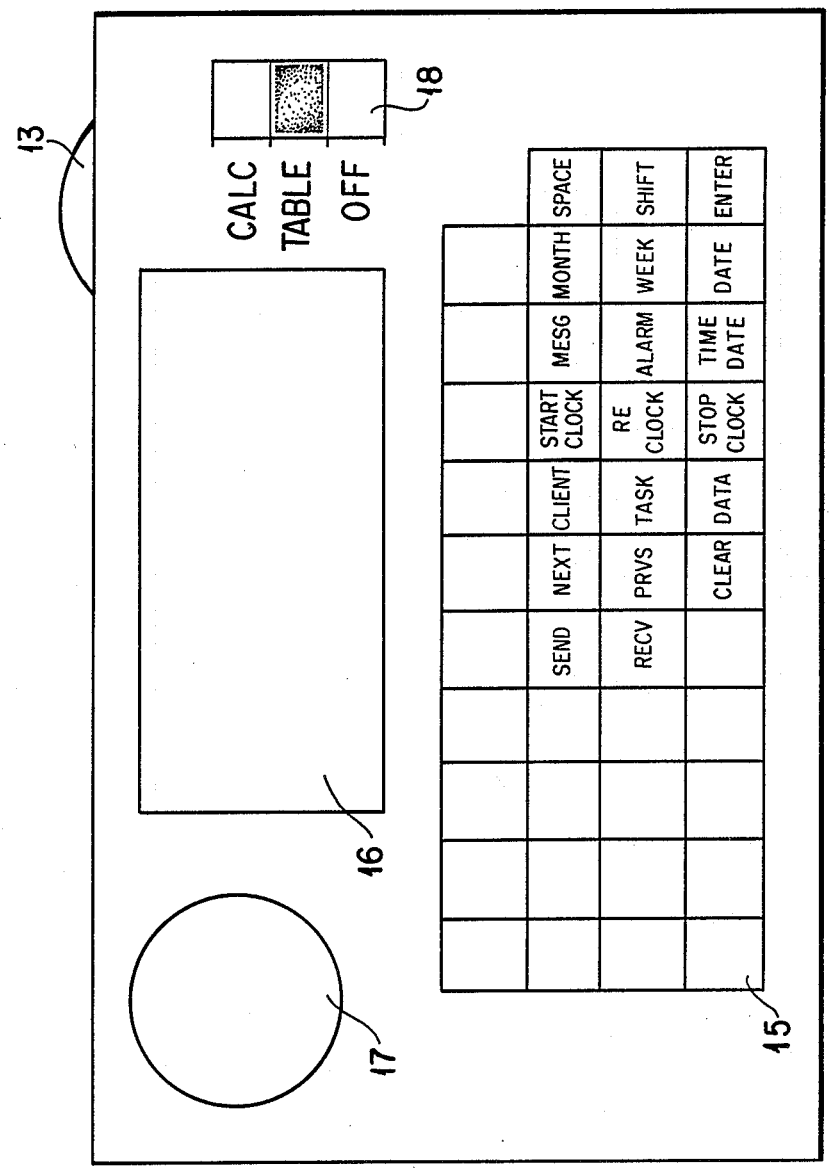
FIG. 2b is a plan view of the perspective of the illustrated embodiment whereby the keys on the keypad illustrate the keys available to the user in order to select from the present invention's available functions (TABLE selector mode)

FIG. 2b is a plan view showing the keys on the keypad 15 that are available to user when the mode selector switch 18 is selected for the TABLE mode. These said keys are the transaction function keys, that enable the user to iput, store, edit, display, transmit, receive and delete transaction information.

Figure 2C:
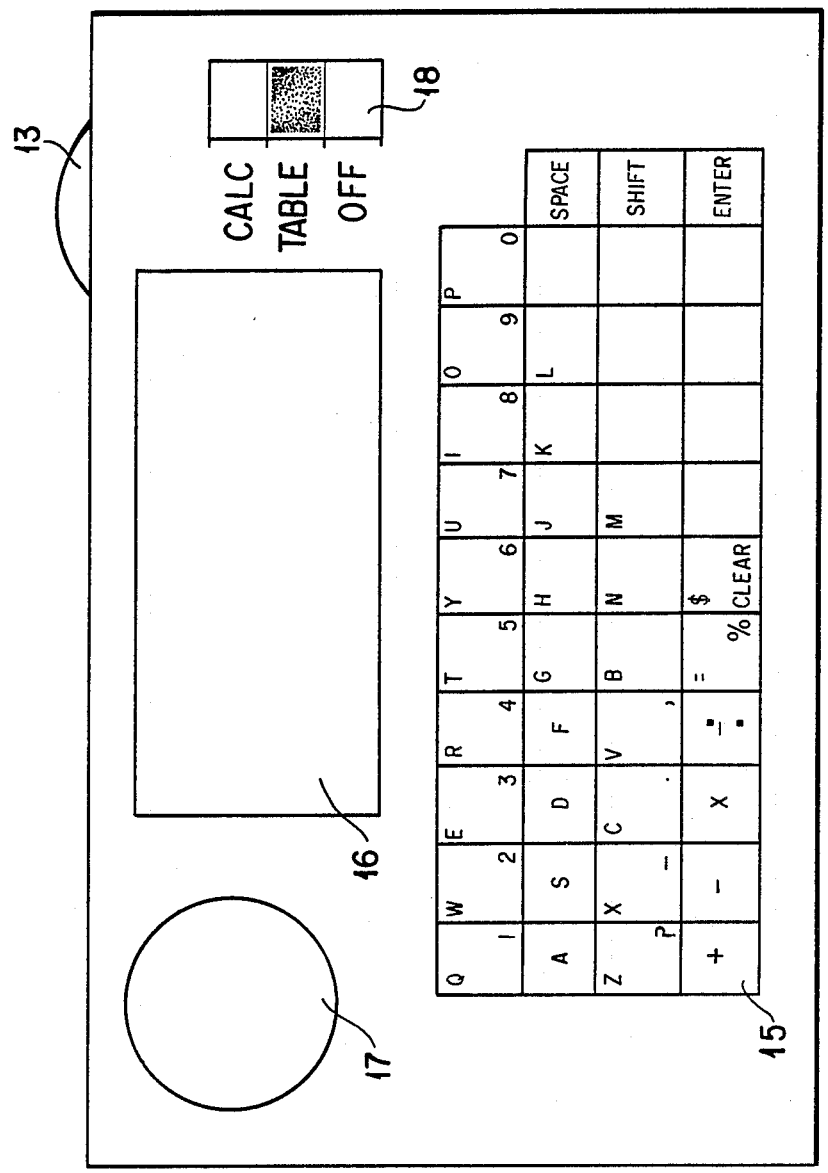
FIG. 2c is a plan view of the perspective of the illustrated embodiment whereby the keys on the keypad illlustrate the keys available to the user to enter further information into the present invention in order to execute the previously user selected function (TABLE selector mode)

FIG. 2c is a plan view showing the keys on the keypad 15 that are available to the user when the mode selector switch 18 is selected for the TABLE mode and after a function key has been selected. These keys include all the alphanumeric keys, the clear, enter, space and shift keys and other non-function keys. These keys are used to describe information in the various tables that exist in, or are to be entered into, the present invention's memory RAM1 8 through 10, in other words the Client Table, the Task Table and the Data Table.

Figure 2D:
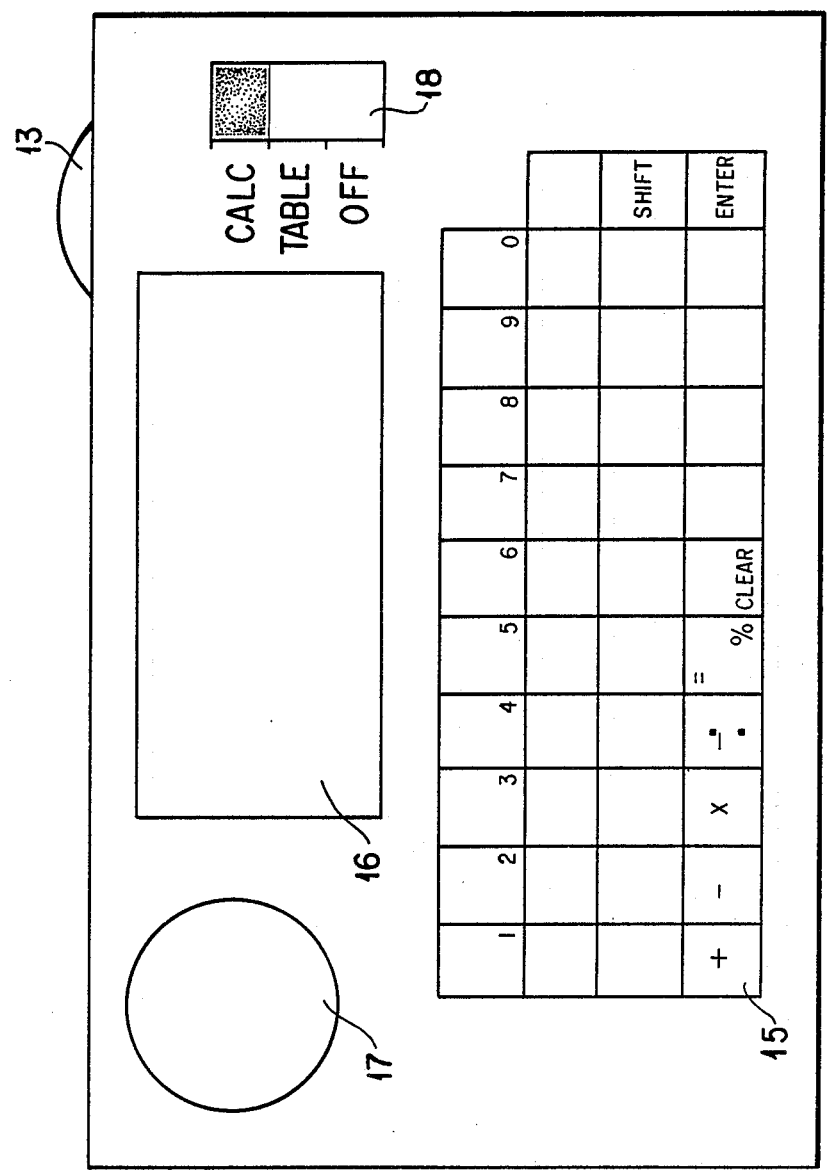
FIG. 2d is a plan view of the perspective of the illustrated embodiment whereby the keys on the keypad illlustrate the keys available to the user when the present invention's mode is set to CALC, i.e. calculator mode.

FIG. 2d is a plan view showing the keys on the keypad 15 that are available to the user when the mode selector switch 18 is selected for the CALC, or calculator mode. If any other key is selected in this mode an error message appears on the display 16.

Tables 1 and 2 enumerate the titles of the respective keys on the keypad 15.

| SYMBOL KEY | KEY DESCRIPTION |
| --- | --- |
| 0-9 | numeric keys |
| A-Z | alphabet keys |
| +,−, /, * | calculator function keys |
| ALARM | Enter a new alarm date and time and associated message into clock & calendar alarm 5 circuit, or display, edit, or delete an existing alarm date and time and/or message that is stored in the clock & calendar alarm 5. |
| CLEAR | Clear the currently displayed information. |
| CLIENT | Enter new CLIENT CODE(s) 20 and CLIENT DESCRIPTION(s) 21, or display, edit, or delete an existing CLIENT CODE(s) 20 and/or CLIENT DESCRIPTION(s) 21. |
| DATA | Enter new AMOUNT(s) 38 and QUANTITY(ies) 39, for a specified CLIENT CODE 20 and/or TASK CODE 28, or display, edit, or delete an existing AMOUNT(s) 38 and/or QUANTITY(ies) 39. |
| DATE | Display, edit, delete, receive or send stored |

-continued

| SYM-BOL KEY | KEY DESCRIPTION |
|---|---|
|  | data for a given CLIENT CODE 20 and/or TASK CODE 28 for a specified date. |
| ENTER | Completes a multi-key function sequence. |
| MONTH | Display, edit, delete, receive or send stored data for a given CLIENT CODE 20 and/or TASK CODE 28 for a specified month. |
| MSG | Enter new message(s) into clock & calendar alarm 5 circuit, or display, edit, or delete existing message(s) that is stored in the clock & calendar alarm 5. Note that the alarm function is disabled. |
| NEXT | Scroll forward the displayed menu or table data. |
| PRVS | Scroll backward the displayed menu or table data. |

TABLE 1

| SYMBOL KEY | KEY DESCRIPTION |
|---|---|
| RECEIVE | Receive table data via the communications interface 13 from a remote computer. |
| RE-CLOCK | Reactivate billing COST 31 per hour. This key is only operable if the STOP CLOCK key was previously selected. |
| SEND | Send table data via the communications interface 13 to a remote computer. |
| START CLOCK | Start billing a specified CLIENT CODE 20 by COST per hour 31. |
| STOP CLOCK | Suspend, or terminate the current billing by COST 31 per hour. |
| TASK | Enter new TASK CODE(s) 28 and TASK DESCRIPTION(s) 29, or display, edit, or delete an existing TASK CODE(s) 28 and/or TASK DESCRIPTION(s) 29. |
| TIME DATE | Display the current date and time. <SHIFT> <TIME DATE> enables the user to set the time and/or date. |
| WEEK | Display, edit, delete, receive or send stored data for a given CLIENT CODE 20 and/or TASK CODE 28 for a specified week. |

FIGS. 3a and 4a illustrate the individual record and field layouts for the Client Table (RAM3 10). The said table contains all information necessary to describe and track a client by means of the user definable fields CLIENT CODE 20, CLIENT DESCRIPTION 21. The following is a description of all of the fields that comprise a single Client Table record:

The POINTER 1ST TASK 19 is an address pointing to the first task description record in the Task Table as depicted in FIGS. 3b and 4b, and stored in RAM2 9. This said field (19) is a single byte address and it is maintained by a program stored in ROM 6, the Table Maintenance Program. This said pointer enables the user to enter, retrieve, edit, display, send, receive and delete all the tasks associated with a specific CLIENT CODE 20. If there are no entries in the Task Table, then the POINTER 1ST TASK 19 is set to zero by the Table Maintenance Program. The Table Maintenance Program uses address hashing to set a value for the POINTER 1ST TASK 19. The hashing algorithm uses a combination of the CLIENT CODE 20 and TASK CODE 28 to calculate an address value for the said pointer (19).

The CLIENT CODE 20 can be a combination of alphanumeric characters, or it can simply be a numeric field. In the present invention's preferred embodiment, a numeric value has been selected to represent the CLIENT CODE 20 (1 byte of memory, 0 through 256 in possible value.

The CLIENT DESCRIPTION 21 field contains all user defined alphanumeric information that is required to describe a given CLIENT CODE 20. For example the CLIENT DESCRIPTION 21 may contain the client's full name and telephone number, and/or address. In this preferred embodiment the information stored in the CLIENT DESCRIPTION 21 field has been standardized to contain the client's name, address and telephone number, a total of 50 bytes of memory in RAM3 10.

The POINTER NEXT CLIENT 22 is a single byte address pointing to the next uniquely user defined Client Table record. If there are no more user defined records in the Client Table, this said pointer is set to zero by the Table Maintenance Program and consequently delimits the end of the current Client Table. This said pointer constructs the Client Table in non-contiguous memory, in conjunction with the POINTER PRVS CLIENT 23.

The POINTER PRVS CLIENT 23 is a single byte address pointing to the previously uniquely user defined Client Table record stored in RAM3 10. If there are no previous user defined records in the Client Table, this said pointer is set to zero by the Table Maintenance Program and consequently delimits the start of the current Client Table, which is accessed by the CLIENT CODE 20. This said pointer constructs the Client Table in non-contiguous memory, RAM3 10, together with the POINTER NEXT CLIENT 22., which form a double linked list of Client Table records.

The last field in the Client Table record is the client COST LIMIT 24. This 2 byte field holds a user defined decimal value, that informs the user when the user has sold, or purchased above this set limit. The present invention obtains this comparison by summing all of the client's related tasks' data AMOUNT 38 fields whenever a new AMOUNT 38 is entered by the user.

The memory allocation of the Client Table records is based upon a hashing algorithm in the Table Maintenance Program, that uses the CLIENT CODE 20 to calculate a unique block of memory in RAM3 10 for each Client Table record. For example, the following three Client Table records, CLIENT CODE equal to 1, CLIENT CODE equal to 2 and CLIENT CODE equal 3, may be assigned the following block starting addresses by the Table Maintenance Program's hashing algorithm; 2001 hexadecimal, 2039 hexadecimal and 2071 hexadecimal respectively. Each respective Client Table record would then occupy 56 consecutive bytes of memory in RAM3 10, beginning at the above mentioned starting addresses.

In the Client Table, the user can enter, retrieve, edit, display, delete, transmit and receive the CLIENT CODE 20, the CLIENT DESCRIPTION 21 and the client COST LIMIT 24 fields. Generally, the user would only enter these said fields once into the invention's memory RAM3 10, thus alleviating the user from entering redundant client information each time a sale or purchase transaction is made. Only the CLIENT CODE 20 needs to be entered for each sale or purchase transaction.

FIGS. 3b, 4b and 5a illustrate the individual record and field layouts for the Task Table, which is stored in RAM2 9. The said table contains all the information necessary to describe and track a specific client's user defined tasks and associated data by means of the user definable fields TASK CODE 28, TASK DESCRIPTION 29, COST TYPE 30 and COST 31. The following is a description of all of the fields that comprise a single Task Table record:

The POINTER 1ST DATA 25 (FIGS. 3b, 4b and 5a) is an address pointing to the first data entry record, for this particular TASK CODE 28, in the Data Table (RAM1 8) as described in FIGS. 3c, 4c and 5b. This said field (25) is a single byte address and it is maintained by a program stored in ROM 6, the Table Maintenance Program. This said pointer enables the user to enter, retrieve, edit, display, send, receive and delete all the data associated with a specific CLIENT CODE 20 and TASK CODE 28 combination (FIGS. 3b and 4b), or by TASK CODE 28 alone (FIG. 5a).

The POINTER NEXT TASK 26 (FIGS. 3b, 4b and 5a) is a single byte address pointing to the next uniquely user defined Task Table record stored in RAM2 9. If there are no more user defined records in the Task Table, this said pointer is set to zero by the Table Maintenance Program and consequently delimits the end of the current Task Table. This said pointer constructs the Task Table in non-contiguous memory, RAM2 9, in conjunction with the POINTER PRVS TASK 27.

The POINTER PRVS TASK 27 (FIGS. 3b, 4b and 5a) is a single byte address pointing to the previous uniquely user defined Task Table record (RAM2 9). If there are no previously user defined records in the Task Table, this said pointer is set to zero by the Table Maintenance Program and consequently denotes the start of the Task Table. This said pointer constructs the Task Table in non-contiguous memory, RAM2 9 together with the POINTER NEXT TASK 27. In other words the Task Table is implemented by means of a doubly linked list.

The TASK CODE 28 can be a combination of alphanumeric characters, or it can simply be a numeric field. In the present invention's preferred embodiment, a numeric value has been selected to represent the TASK CODE 28 (1 byte of memory, 0 through 256 in possible value).

The TASK DESCRIPTION 29 field contains all user defined alphanumeric information that is required to describe a given TASK CODE. For example the TASK DESCRIPTION 29 may contain a brief description of the COST TYPE 30 and COST 31 fields, as well as any other information that will assist the user to identify the TASK CODE 28. A total of 20 bytes of RAM2 9 memory has been allocated in the preferred embodiment for this said field.

The COST TYPE 30 field is a single byte that enables the Table Maintenance Program to recognize which costing structure the user wishes to select for a given TASK CODE 28 and TASK DESCRIPTION 29. For example, if the user selects the tables as described in; FIG. 3b a COST TYPE 30 of 3, then the COST TYPE 30 would reflect the COST (PER ITEM) structure; FIG. 4b a COST TYPE 30 of 2, then the COST TYPE 30 would reflect the COST (PER HOUR) structure; FIG. 5a a COST TYPE 30 of 1, then the COST TYPE 30 would reflect the total COST structure.

The COST TYPE 30 field, for a COST PER ITEM, is defined by the user if the present invention is being used to purchase or sell items based on bulk purchasing or selling. For example if the invention is being used by the purchasing agent of a retail store. This said field would contain the decimal value of the item described by the TASK CODE 28 and the TASK DESCRIPTION 29.

If the present invention is to be used by a professional person who bills a client by an hourly fee, then the COST TYPE 30 field would represent the user definable COST PER HOUR fee (FIG. 4b), instead of COST PER ITEM (FIG. 3b).

In certain applications of the present invention, the COST PER ITEM or the COST PER HOUR fields may not necessarily be used. For example if the present invention is used to track monthly consumer purchases, which are not bought in bulk, then the Task Table would serve as a single point of reference table for purchase recording and manipulation and the Client Table would be inactive. Consequently the COST PER ITEM field would not be used and all data would be recorded and tracked by the TASK CODE 28, TASK DESCRIPTION 29, DATE TIME 37, AMOUNT 38 and QUANTITY 39. Refer to FIGS. 5a and 5b.

The last field in the Task Table record is the client task COST LIMIT 32. This 2 byte field holds a user defined decimal value, that informs the user when the user has sold, or purchased above this set limit, for the given task. The present invention obtains this comparison by summing all of the tasks' data AMOUNT 38 fields whenever a new AMOUNT 38 is entered by the user, for the same task.

The memory allocation of the Task Table records is based upon a hashing algorithm in the Table Maintenance Program, that uses the CLIENT CODE 20 and TASK CODE 28 to calculate a unique block of memory in RAM2 9 for each Task Table record. For example, for a CLIENT CODE equal to 1, its associated Task Table records for TASK CODEs of 2 and 3, may be assigned to start at 5001 hexadecimal and 501E hexadecimal respectively. Each respective Task Table record would occupy 29 consecutive bytes of memory in RAM2 9, beginning at the said respective starting addresses.

In the Task Table, the user can enter, retrieve, edit, display, delete, transmit and receive the TASK CODE 28, the TASK DESCRIPTION 29, the COST TYPE 30, the COST 31 and the task COST LIMIT 32 fields. Generally, the user would only enter these said fields once into the invention's memory RAM2 9, thus alleviating the user from entering redundant task information each time a transaction is made. Only the TASK CODE 28 needs to be entered for each transaction.

FIGS. 3c, 4c and 5b illustrate the individual record and field layouts for the Data Table, which is stored in RAM1 8. The said table contains all information necessary to enter and consequently track, transaction data relating to a specific CLIENT CODE 20 and/or TASK CODE 28 combination.

The DATE TIME 37 field in the Data Table is automatically updated by a program stored in ROM 6, the Real Time Clock Program, which obtains this information from the clock & calendar update circuit 4, whenever the user stores transaction data in the Data Table. The user enters a decimal value representative of the total cost of the sale or purchase in the AMOUNT 38 field.

The user enters a numeric value representative of the number of items that the AMOUNT 38 covers by the QUANTITY 39 field.

In the case where the COST TYPE 39 field represents a COST PER ITEM 31 field in the Task Table (FIG. 3b) for a purchase application, the QUANTITY 39 field is simply used to correlate the validity of the user's data entry field AMOUNT 38 by multiplying the QUANTITY 39 by the COST PER ITEM 31.

In the case where the COST TYPE 30 field represents a COST PER ITEM 31 field in the Task Table (FIG. 3b) for a sales application, the QUANTITY 39 field is used together with the COST PER ITEM 31 to automatically calculate and update the AMOUNT 38 field. The AMOUNT 38 would then reflect the monies owing to the salesperson by the client described by the CLIENT CODE for goods or services rendered as described by the TASK CODE 28.

In the case where the COST TYPE 30 field represents a COST PER HOUR 31 field in the Task Table (FIG. 4c), the AMOUNT 38 and QUANTITY 39 fields are updated by a program residing in ROM 6, the Bill Per Hour Program, and are not updated by the user. In this said application of the invention, the Bill Per Hour Program, would enter the total time spent on the CLIENT CODE's TASK CODE 28 in the QUANTITY 39 field and combining this AMOUNT 38 with the user defined COST PER HOUR 31 field value in the Task Table record in FIG. 4b, the said program would automatically calculate the associated cost of the QUANTITY 39 of time billed to the CLIENT CODE's TASK CODE 28, and enter this calculated cost in the AMOUNT 38 field in the Data Table record, FIG. 4c.

In the case where the user does not use the COST 31 fields in the Task Table (FIG. 5a), then the AMOUNT 38 field would reflect the cost of the total user transaction. The QUANTITY 39 field would reflect the number of individual transaction items, or services that the AMOUNT 38 covers.

The POINTER TASK DESC 33 is a single byte address pointing to the associated task description record in the Task Table (FIGS. 3b, 4b and 5a). In other words this said pointer logically links each entry in the Data Table (FIGS. 3c, 4c and 5b) to a unique TASK CODE 28 and TASK DESCRIPTION 29 in the Task Table (FIGS. 3b, 4b and 5a).

The POINTER SAME TASK 34 is a single byte address pointing to the next record in the Data Table (FIGS. 3c, 4c and 5b), such that the record pointed to has the same TASK CODE 28 as the present Task Table record. This pointer enables the user to loop through all the records in the Data Table for a given CLIENT CODE 20 and TASK CODE 28 (FIGS. 3 and 4). This pointer also enables the user to loop through all the records in the Data Table for a given TASK CODE 28 (FIG. 5). This said pointer (34) is maintained by the Table Maintenance Program.

The POINTER NEXT DATE 35 is a single byte address pointing to the next record in the Data Table, that was entered sequentially in time after the present record, into the Data Table (FIGS. 3c, 4c and 5b). If there are no more user defined records in the Data Table, this said pointer is set to zero by the Table Maintenance Program and consequently delimits the end of the current Data Table, accessed by CLIENT CODE 20 and TASK CODE 28 (FIGS. 3 and 4) or solely by TASK CODE 28 (FIG. 5), for data entry. This said pointer (35) constructs the Data Table in non-contiguous memory, RAM1 8 in conjunction with the POINTER PRVS DATE 36.

The POINTER PRVS DATE 36 is a single byte address pointing to the previous record in the Data Table, that was entered sequentially in time before the present record, into the Data Table (FIGS. 3c, 4c and 5b). If there are no previously user entered records in the Data Table, this said pointer is set to zero by the Table Maintenance Program and consequently delimits the start of the current Data Table, accessed by CLIENT CODE 20 and TASK CODE 28 (FIGS. 3c and 4c) or solely by TASK CODE 28 (FIG. 5b), for data entry. This said pointer constructs the Data Table in non-contiguous memory, RAM1 8, together with the POINTER NEXT DATE 35.

The memory allocation of the Data Table records is based upon a hashing algorithm in the Table Maintenance Program, that uses the CLIENT CODE 20, the TASK CODE 28 and the DATE TIME 37 fields to calculate a unique block of memory in RAM3 10 for each Client Table record (FIGS. 3c and 4c). For example, a CLIENT CODE of 1, a TASK CODE of 1 and DATE TIMEs of 010188 (MMDDYY) 12:00 p.m. 010188 12:01 p.m., are allocated by the Table Maintenance Program's hashing algorithm, block starting addresses of 7001 hexadecimal and 7009 hexadecimal respectively. Each Client Task Data record occupies 8 consecutive bytes of memory in RAM1 8, starting at the above mentioned addresses.

In the Data Table, the user can enter, retrieve, edit, display, delete, transmit and receive the AMOUNT 38 and QUANTITY 39 fields. The DATE TIME 37 field can be retrieved, displayed, transmitted and received by the user. Data retrieval is achieved by entering a unique combination of a CLIENT CODE 20, a TASK CODE 28 and a DATE TIME 37 (FIGS. 3c and 4c), or by a unique combination of TASK CODE 28 and DATE TIME 37 (FIG. 5b). Refer also to the description of the WEEK, MONTH and DATE keys—figures 6f, 6g and 6h.

Figure 6C:
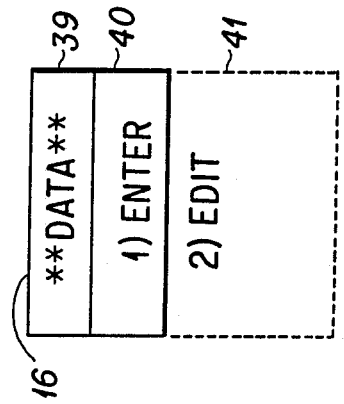
FIGS. 6a, 6b, 6c, 6d, 6e, 6f, 6g, 6h, 6i, and 6j are diagrammatic representations of the various system menus generated by the present invention, on the present invention's display 16 unit, in response to a user selected function key on the keypad 15.
Figure 6F:
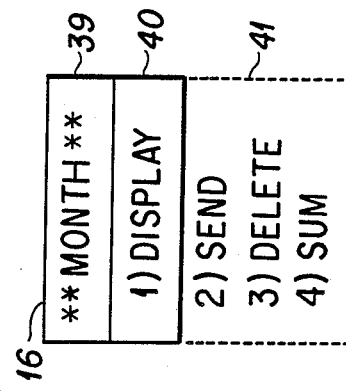
Figure 6B:
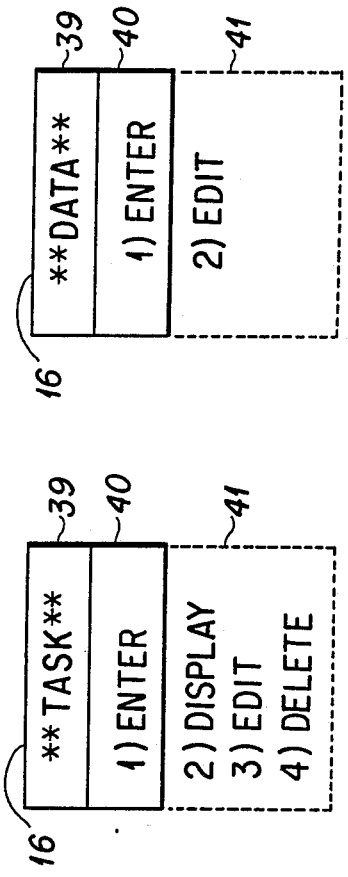
Figure 6E:
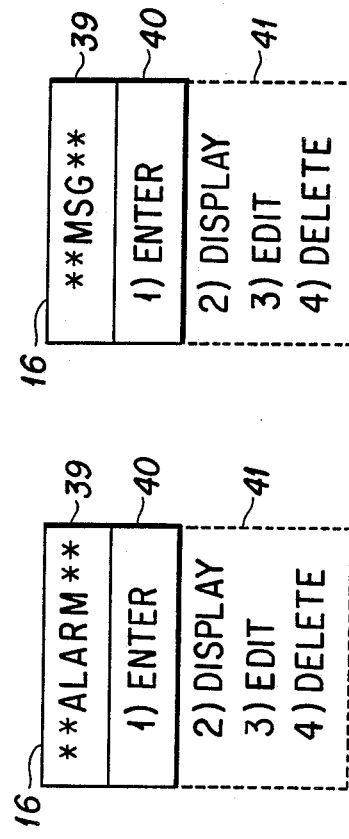
Figure 6A:
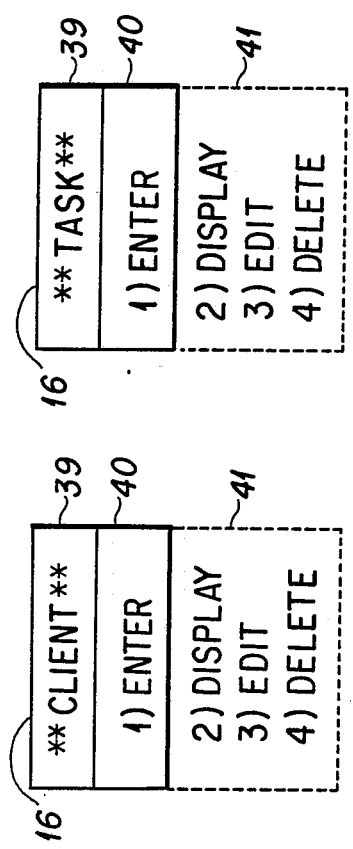

FIGS. 6a through 6j illustrate the display 16 when a menu function key of the present invention is selected on the keypad 15—CLIENT, TASK, DATA, ALARM, MSG, MONTH, WEEK, DATE, SEND or RECEIVE. The visible display is subdivided into two lines. The top most line 39 illustrates the type of function key selected. For example if the CLIENT key is selected, then the message ' CLIENT ' is displayed on the top line 39 (FIG. 6a). The bottom line 40 and 41 illustrate a menu of available selections for the function defined on the top line 39. For example in FIG. 6a, the user is able to:

(1) Enter a new client into the present invention,
(2) Display information pertaining to an existing client,
(3) Edit information pertaining to an existing client and
(4) Delete an existing client from the present invention's Client Table.

Only a single line of a menu's available selection is displayed, namely the top line 40. The user has to use the scroll keys, NEXT or PRVS on the keypad 15 to access the hidden selections (41), which are illustrated by means of a broken line in FIGS. 6a through 6j. The NEXT key allows the user to scroll forward and the PRVS key enables the user to scroll backwards. For example, in FIG. 6a, if the user presses the NEXT key twice, the display 16, bottom line 40 would contain '3) Edit'. If the user now presses the PRVS key once, the display 16, bottom line 40 would contain '2) Display'. To execute a currently displayed menu function the user presses the ENTER key on the keypad. To cancel a currently displayed menu function, the user presses the CANCEL key on the keypad 15. Throughout these scrolling actions the display 16, top line 39 remains static and unchanged—for example in FIG. 6a, the display 16 top line 39 would continuously display ' CLIENT ' whilst the user scrolled through the available menu selections, displayed in the bottom line 40.

FIG. 6a illustrates the display 16 when the CLIENT function key is selected on the keypad 15.

The CLIENT menu function '1) Enter' allows the user to enter a new client into the Client Table. The Client Enter Program, stored in ROM 6 initially checks to see if the newly entered CLIENT CODE 20 already exists in the Client Table, RAM3 10. If the new CLIENT CODE 20 already exists, then an error message is displayed in the display 16 bottom line 40 and prompts the user to re-enter a unique CLIENT CODE. Otherwise the user is prompted to enter the CLIENT DESCRIPTION 21 and the client COST LIMIT 24 fields. All relevant pointers in the Client Table record are updated (FIGS. 3a and 4a). Note that if the user does not want to use the COST LIMIT 24 function of the present invention, the user simply enters a zero value when prompted on the display 16 to enter this field.

The CLIENT menu function '2) Display' displays all of the information stored in the existing Client Table, namely the CLIENT CODEs 20, the associated CLIENT DESCRIPTION 21 and client COST LIMIT 24. The user is able to scroll through and view existing entries in the Client Table by using the NEXT and PRVS keys on the keypad 15.

The CLIENT menu function '3) Edit' enables the user to alter the CLIENT DESCRIPTION 21, or client COST LIMIT 24 stored in the existing Client Table for a given CLIENT CODE 20. Note that the present invention's preferred embodiment does not allow the user to edit the CLIENT CODE 20 for an existing client, although it is possible for the present invention's data structures to handle this function and would simply require a special program to be stored in ROM 6 to execute this additional feature.

The CLIENT menu function '4) Delete' deletes all entries for a given CLIENT CODE 20 in the Data Table, the Task Table and the Client Table.

FIG. 6b illustrates the display 16 when the TASK function key is selected on the keypad 15. When this key is selected, the present invention prompts the user to enter an existing CLIENT CODE 20. The user entered CLIENT CODE 20 is validated and if the said code exists, then the present invention uses the CLIENT CODE 20 to index the related Task Table records in RAM2 9. If the user entered a non-existent CLIENT CODE 20, an error message is displayed on the display 16 bottom line 40, prompting the user to re-enter a valid CLIENT CODE 20.

The TASK menu function '1) Enter' allows the user to enter a new task (TASK CODE 28) for an existing client (CLIENT CODE 20) into the Task Table. The Task Enter Program, stored in ROM 6 initially checks to see of the newly entered TASK CODE 28 already exists in the Task Table, for the considered CLIENT CODE 20. If the new TASK CODE 28 already exists, then an error message is displayed in the display 16 bottom line 40 and prompts the user to re-enter a unique TASK CODE 28 for the selected client. (Note that the same TASK CIODE 28 can exist in the Task Table for different CLIENT CODEs 20). If the validation succeeds, the user is prompted to enter the TASK DESCRIPTION 29, the COST TYPE 30, the COST 31 and the client's task's COST LIMIT 32. All relevant pointers in the Task Table record are updated (FIGS. 3b, 4b and 5a). Note that if the user does not want to use the COST LIMIT 32 function of the present invention, the user simply enters a zero value when prompted on the display 16 to enter this field.

The TASK menu function '2) Display' displays all of the information stored in the existing Task Table for a unique CLIENT CODE 20, namely the TASK CODEs 28, the associated TASK DESCRIPTIONs 29, COST TYPEs 30, COSTs 31 and COST LIMIT 32. The user is able to scroll through and view the Task Table records for the given CLIENT CODE 20 using the NEXT and PRVS keys on the keypad 15.

The TASK menu function '3) Edit' enables the user to alter the TASK DESCRIPTION 29, COST TYPE 30, COST 31, or COST LIMIT 32 stored in the existing Task Table for a given combination of CLIENT CODE 20 and TASK CODE 28. Note that the present invention's preferred embodiment does not allow the user to edit the TASK CODE 28 for an existing client, although it is possible for the present invention's data structures to implement and would simply require a special program to be stored in ROM 6 to execute this additional function.

The TASK menu function '4) Delete' deletes all entries for a given CLIENT CODE 20 and TASK CODE 28 combination in the Data Table and it also deletes the related record in the Task Table.

FIG. 6c illustrates the display 16 when the DATA function key is selected on the keypad 15. When this key is selected, the present invention prompts the user to enter an existing CLIENT CODE 20 and TASK CODE 28 combination. These entries are validated and if the said codes exist, then the present invention uses the CLIENT CODE 20 and TASK CODE 28 combination to index the related Data Table records in RAM1 8. If the user entered a non-existent code combination, an error message is displayed on the display 16 bottom line 40, informing the user that either the entered CLIENT CODE 20, or the entered TASK CODE 28 is invalid and also prompting the user to re-enter a valid code.

The DATA menu function '1) Enter' allows the user to enter new data for an existing CLIENT CODE 20 and TASK CODE 28 combination into the Data Table. The user is then prompted to enter the AMOUNT 38 and QUANTITY 39. The data '1) Enter' menu selection is only valid for TASK CODEs 28 that are not billable by COST 31 per hour. The cost per hour data entry is primed when the user selects a TASK CODE 28 with an associated COST TYPE 30 representative of hourly rate billing. The present invention then expects the user to select the START CLOCK key on the keypad 15 to start the client's billing clock. The user selects the STOP CLOCK key on the keypad 15 to either suspend the client's current billing clock (to be resumed at a later time), or to stop the billing clock for the client. The DATE TIME 37 is automatically generated by the Data Entry Program stored in ROM 6, using the clock & calendar update 3 module, which records the time and date at which the user initiated the current data entry transaction. All relevant pointers in the Data Table record are updated (FIGS. 3c, 4c and 5b).

The DATA menu function '2) Edit' enables the user to alter the AMOUNT 38 and QUANTITY 39, stored in the existing Data Table for a given valid combination of CLIENT CODE 20 and TASK CODE 28. The DATE TIME 37 field in the Data Table record cannot be edited by the user in the preferred embodiment of the invention.

Figure 6D:
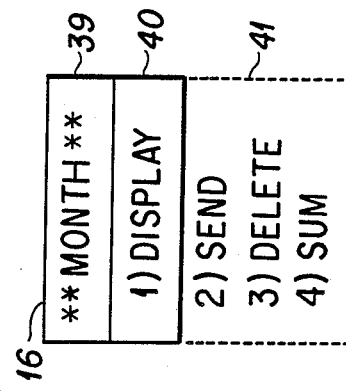

FIG. 6d illustrates the display 16 when the ALARM function key is selected on the keypad 15. The ALARM menu selection '1) Enter' enables the user to set a new alarm condition in the clock & calendar alarm 5 circuit. When the alarm entry selection is made, the present invention prompts the user to enter the date and time as to when the requested alarm is to be triggered. The user is then prompted to enter a message relating to the alarm condition, which is limited to 40 alphanumeric characters in the present invention's preferred embodiment. All the user entered alarm data is stored in the clock & calendar alarm 5 circuit. The CPU 7 initializes the coincidence detection circuit 4 to be triggered at the user's selected alarm date and time. When the coincidence detection circuit 4 triggers an existing ALARM condition, the ALARM's related message is displayed on the display 16's bottom line 40 by the Alarm Detection Program stored in ROM 6. The Alarm Detection Program also displays on the display 16's top line 39 the message ' ALARM ACTIVE ' and it triggers an audio signal via the sound generator 14 and speaker 17. The user disables the audio alarm by pressing the ALARM function key twice. The alarm message remains active on the display's 16 bottom line 40, after the user has disabled the audio signal, for 31 seconds or until the user selects a function key on the keypad 15.

The ALARM menu function '2) Display' displays all of the information stored in the clock & calendar alarm 5 circuit, i.e. the date and times of the alarm messages and the text of the said alarms.

The ALARM menu function '3) Edit' enables the user to alter the times and dates and/or the associated ALARM descriptions stored in the clock & calendar alarm 5 circuit. The user selects the correct ALARM to be edited by scrolling through the stored ALARMs in the clock & calendar alarm 5 circuit by means of the NEXT and PRVS keys on the keypad 15, and upon finding the desired ALARM, presses the ENTER key on the keypad 15.

The ALARM menu function '4) Delete' deletes an entry in the clock & calendar alarm 5 circuit. The user selects the correct ALARM for deletion by scrolling through the stored ALARMs in the clock & calendar alarm 5 circuit by means of the NEXT and PRVS keys on the keypad 15, and upon finding the desired ALARM, presses the ENTER key on the keypad 15. The ALARM entry is then deleted from the clock & calendar alarm 5 circuit.

FIG. 6e illustrates the display 16 when the MSG function key is selected on the keypad 15. This function allows the user to store and manipulate messages in the present invention. The preferred embodiment stores all MSG data in the clock & calendar alarm 5 circuit, except that the Message Entry Program stored in ROM 6, disables the alarm triggering mechanism for a MSG, such that only a description is stored in the clock & calendar alarm 5 circuit.

The MSG menu selection '1) Enter' enables the user to store a new message in the clock & calendar alarm 5 circuit. When the MSG entry selection is made, the present invention prompts the user to enter a message, which is limited to 40 characters in the present invention's preferred embodiment. The Message Entry Program stores the time and date at which the message was entered into the present invention together with the message in the clock & calendar alarm 5 circuit.

The MSG menu function '2) Display' enables the user to view a previously entered message stored in the clock & calendar alarm 5 circuit. The user selects the correct MSG to be viewed by scrolling through the stored MSGs in the clock & calendar alarm 5 circuit by means of the NEXT and PRVS keys on the keypad 15.

The MSG menu function '3) Edit' enables the user to alter a previously entered message stored in the clock & calendar alarm 5 circuit. The user selects the correct MSG to be edited by scrolling through the stored MSGs in the clock & calendar alarm 5 circuit by means of the NEXT and PRVS keys on the keypad 15, and upon finding the desired MSG, presses the ENTER key on the keypad 15.

The MSG menu function '4) Delete' deletes a MSG entry in the clock & calendar alarm 5 circuit. The user selects the correct MSG for deletion by scrolling through the stored MSGs in the clock & calendar alarm 5 circuit by means of the NEXT and PRVS keys on the keypad 15, and upon finding the desired MSG, presses the ENTER key on the keypad 15. The MSG entry is then deleted from the clock & calendar alarm 5 circuit.

FIG. 6f illustrates the display 16 when the MONTH function key is selected on the keypad 15. This function allows the user to display, to transmit to a remote device via the communications interface 13, to delete entries in the Data Table and to obtain the numeric sum of the AMOUNT 38 fields, that were entered into the said table during the present month for a given CLIENT CODE 20 and/or TASK CODE 28. After the user has selected the MONTH key on the keypad 15, a message appears on the display 16 bottom line 40 prompting the user to enter a CLIENT CODE 20, which is validated. If the entered CLIENT CODE 20 does not exist, an error message is displayed on the display 16 bottom line 40 prompting the user to re-enter a valid CLIENT CODE 20. At this stage the user can select the CLIENT key on the keypad 15, which will enable the user to scroll through the Client Table stored in RAM3 10 to obtain the required CLIENT CODE 20. Once the user has entered a valid CLIENT CODE 20, the user is prompted to enter a TASK CODE 28. If the user wishes to deal with all the entries, for all tasks in the Data Table, the user simples enters a TASK CODE 28 of 999. If the user wishes to deal with Data Table entries specific to a TASK CODE 28, then the user would enter the desired TASK CODE 28. At this stage the user can select the TASK key on the keypad 15, which will enable the user to scroll through the Task Table to obtain the required TASK CODE 28. Once the user has entered a valid TASK CODE 28, the MONTH menu appears on the display 16 bottom line 40.

The MONTH menu selection '1) Display' enables the user to view all the current month's entries in the Data Table on the display 16 for the given CLIENT CODE 20 and TASK CODE 28. Once the user has entered a valid CLIENT CODE 20 and TASK CODE 28, a single chronological entry in the Data Table is displayed in the display 16's bottom line 40. The user manipulates the said display by means of the scroll keys NEXT and PRVS on the keypad 15. For example if the user wishes to view the next chronological entry in the Data Table, then the user would press the NEXT key. If the user wishes to view the previous chronological entry in the Data Table, then the user would press the PRVS key. Once the user has finished with the MONTH function, the ENTER key is selected by the user on the keypad 15.

The MONTH menu selection '2) Send' enables the user to transmit all the current month's entries, for a given CLIENT CODE 20 and TASK CODE 28, in the Data Table via the communications interface 13 to a remote device, such as a computer or a printer. The Communications Program stored in ROM 6 sets up the communications link between the present invention and the remote device. If communications between the present invention and the remote device cannot be set up, then an error message appears on the display 16's bottom line 40 informing the user of the problem. Once communications has been successfully initialized, all the current month's entries in the Data Table are formatted and transmitted via the communications interface 13 to the remote device. The formatting of month's entries is handled by the Format Program stored in ROM 6, which frames each Data Table entry with special binary characters as required by the remote device.

The MONTH menu selection '(3) Delete' enables the user to delete all the current month's entries from the Data Table for the given CLIENT CODE 20 and TASK CODE 28. Before the Delete Program, stored in ROM 6, deletes all the said entries from the Data Table, a message appears on the display 16's bottom line 40 asking the user whether or not the user really wishes to proceed with the month's delete. If the user answers in the affirmative, then all the month's entries for the given CLIENT CODE 20 and TASK CODE 28 are deleted from the Data Table. All relevant pointers in the Task Table records are updated (FIGS. 3b, 4b and 5a).

The MONTH menu selection '(4) Sum' enables the user to obtain a running total in dollars and cents of all the current month's entries in the Data Table for a given CLIENT CODE 20 and TASK CODE 28. The user is also able to obtain a running total for all the client's tasks that are stored in the Data Table for the current month, by selecting a specific CLIENT CODE 20 and setting the TASK CODE 28 to 999.

Figure 6H:
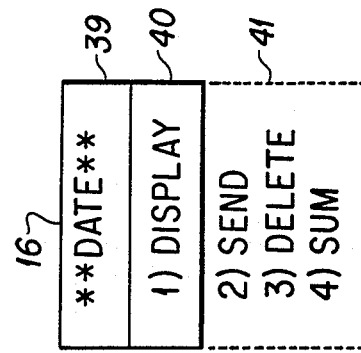
Figure 6J:
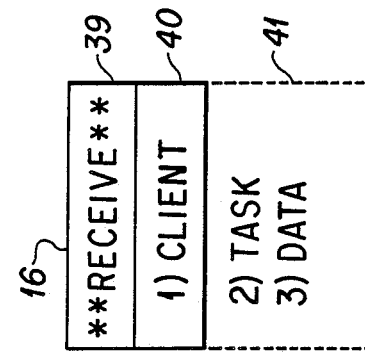
Figure 6G:
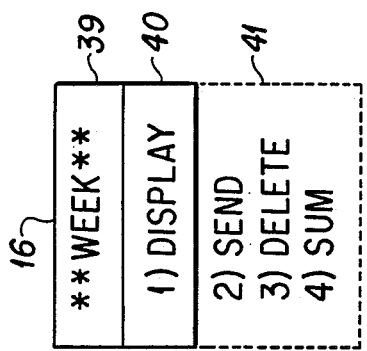

FIG. 6g illustrates the display 16 when the WEEK function key is selected on the keypad 15. This function allows the user to display, to transmit to a remote device via the communications interface 13, to delete entries and to obtain the numeric sum of the AMOUNT 38 FIELDS in the Data Table, that were entered into the said table during the present week (Monday through Sunday) for a given CLIENT CODE 20 and TASK CODE 28. After the user has selected the WEEK key on the keypad 15, a message appears on the display 16 bottom line 40 prompting the user to enter a CLIENT CODE 20, which is validated. If the entered CLIENT CODE 20 does not exist, an error message is displayed on the display 16 bottom line 40 prompting the user to re-enter a valid CLIENT CODE 20. At this stage the user can select the CLIENT key on the keypad 15, which will enable the user to scroll through the Client Table to obtain the required CLIENT CODE 20. Once the user has entered a valid CLIENT CODE 20, the user is prompted to enter a valid TASK CODE 28. If the user wishes to deal with all the entries, for all tasks in the Data Table, the user simples enters a TASK CODE 20 of 999. If the user wishes to deal with Data Table entries specific to a TASK CODE 20, then the user would enter the desired TASK CODE 20. At this stage the user can select the TASK key on the keypad 15, which will enable the user to scroll through the Task Table to obtain the required TASK CODE 28. Once the user has entered a valid TASK CODE 28, then the WEEK menu appears on the display 16 bottom line 40.

The WEEK menu selection '(1) Display' enables the user to view all of the current week's entries in the Data Table on the display 16 for the selected CLIENT CODE 20 and TASK CODE 28. A single chronological entry in the Data Table is displayed in the display 16's bottom line 40. The user manipulates the said display as previously described. Once the user has finished with the WEEK function, the ENTER key is selected by the user on the keypad 15.

The WEEK menu selection '(2) Send' enables the user to transmit all of the current week's entries, for the selected CLIENT CODE 20 and TASK CODE 28, in the Data Table via the communications interface 13 to a remote device, such as a computer or a printer. The Communications Program sets up the communications link between the present invention and the remote device. Once communications has been successfully initialized, all the current week's entries in the Data Table are formatted and transmitted via the communications interface 13 to the remote device. The formatting of week's entries is handled by the Format Program, which frames each Data Table entry with special binary characters as required by the remote device.

The WEEK menu selection '(3) Delete' enables the user to delete all of the current week's entries from the Data Table for the selected CLIENT CODE 20 and TASK CODE 28. Before the Delete Program deletes all of the said entries from the Data Table, a message appears on the display 16's bottom line 40 asking the user whether or not the user really wishes to proceed with the week's delete. If the user answers in the affirmative, then all the week's entries for the selected CLIENT CODE 20 and TASK CODE 28 are deleted from the Data Table. All relevant pointers in the Task Table records are updated (FIGS. 3b, 4b and 5a).

The WEEK menu selection '(4) Sum' enables the user to obtain a running total in dollars and cents of all the current week's entries in the Data Table for a selected CLIENT CODE 20 and TASK CODE 28. The user is also able to obtain a running total for all the client's tasks that are stored in the Data Table for the current week, indexed by CLIENT CODE 20 and by setting the TASK CODE 28 to 999.

FIG. 6h illustrates the display 16 when the DATE function key is selected on the keypad 15. This function allows the user to display, to transmit to a remote device via the communications interface 13, to delete entries and to obtain the numeric sum of the AMOUNT 38 fields in the Data Table, that were entered into the said table during a selected date (month, day, year), or a range between two dates for a given CLIENT CODE 20 and TASK CODE 28. After the user has selected the DATE key on the keypad 15, a message appears on the display 16 bottom line 40 prompting the user to enter a CLIENT CODE 20, which is validated. If the entered CLIENT CODE 20 does not exist, an error message is displayed on the display 16 bottom line 40 prompting the user to re-enter a valid CLIENT CODE 20. At this stage the user can select the CLIENT key on the keypad 15, which will enable the user to scroll through the Client Table to obtain the required CLIENT CODE 20. Once the user has entered a valid CLIENT CODE 20, the user is prompted to enter al valid TASK CODE 28. If the user wishes to deal with all the entries, for all tasks in the Data Table, the user simples enters a TASK CODE 20 of 999. If the user wishes to deal with Data Table entries specific to a TASK CODE 20, then the user would enter the desired TASK CODE 20. At this stage the user can select the TASK key on the keypad 15, which will enable the user to scroll through the Task Table to obtain the required TASK CODE 28. Once the user has entered a valid TASK CODE 28, the user is prompted to enter either a single date (MMDDYY), or two dates signifying a range (MMDDYY1 to MMDDYY2). The term 'date range' shall be used to represent either a single valued date, or a range of dates between two values in the following description. The DATE menu then appears on the display 16 bottom line 40.

The DATE menu selection '(1) Display' enables the user to view all the current date range's entries in the Data Table on the display 16 for the given CLIENT CODE 20 and TASK CODE 28. A single chronological entry in the Data Table is displayed in the display 16's bottom line 40. The user manipulates the said display by means of the scroll keys NEXT and PRVS on the keypad 15, as previously described. Once the user has finished with the DATE function, the ENTER key is selected by the user on the keypad 15.

The DATE menu selection '(2) Send' enables the user to transmit all of the current date range's entries, for the selected CLIENT CODE 20 and TASK CODE 28, in the Data Table via the communications interface 13 to a remote device, such as a computer or a printer. The Communications Program sets up the communications link between the present invention and the remote device. Once communications has been successfully initialized, all the current date range's entries in the Data Table or formatted and transmitted via to the communications interface 13 the remote device. The formatting of date range's entries is then undertaken.

The DATE menu selection '(3) Delete' enables the user to delete all of the current date range's entries in the Data Table for the selected CLIENT CODE 20 and TASK CODE 28. Before the Delete Program deletes all of the said entries from the Data Table, a message appears on the display 16's bottom line 40 asking the user whether or not the user really wishes to proceed with the date range's delete. If the user answers in the affirmative, then all the date range's entries for the selected CLIENT CODE 20 and TASK CODE 28 are deleted from the Data Table. All relevant pointers in the Task Table records are updated (FIGS. 3b, 4b and 5a).

The DATE menu selection '(4) Sum' enables the user to obtain a running total in dollars and cents of all the current date range's entries in the Data Table for the selected CLIENT CODE 20 and TASK CODE 28. The user is also able to obtain a running total for all the client's tasks that are stored in the Data Table for the date range, by selecting a specific CLIENT CODE 20 and setting the TASK CODE 28 to 999.

Figure 6I:
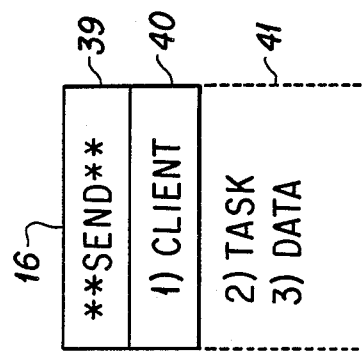

FIG. 6i illustrates the display 16 when the SEND function key is selected on the keypad 15. This function allows the user to transmit to a remote device via the communications interface 13, entries from the Client Table, Task Table and the Data Table, that are presently stored in the present invention. The Communications Program sets up the communications link between the present invention and the remote device. Once communications has been successfully initialized, the following options appear in the display 16's bottom line 40:

Menu option '(1) CLIENT', enables the user to send a single entry in the Client Table identified by the user entering a specific CLIENT CODE 20 on the keypad 15. The present invention prompts the user to enter a valid CLIENT CODE 20. At this stage the user can select the CLIENT key on the keypad 15, which will enable the user to scroll through the Client Table to obtain the required CLIENT CODE 20. The user can also send all of the entries in the said table, identified by the user entering a CLIENT CODE 20 of 999 on the keypad 15. Once the user has entered a valid CLIENT CODE 20, the Format Program formats all of the relevant records in the Client Table for transmission via the communications interface 13 to the remote device;

Menu option '(2) TASK', enables the user to send a single entry in the Task Table by the user entering a specific CLIENT CODE 20 and a specific TASK CODE 28 combination on the keypad 15. The present invention prompts the user to enter a valid CLIENT CODE 20. At this stage the user can select the CLIENT key on the keypad 15, which will enable the user to scroll through the Client Table to obtain the required CLIENT CODE 20. Once a valid CLIENT CODE 20 has been entered by the user, the present invention prompts the user to enter a valid TASK CODE 28. At this stage the user can select the TASK key on the keypad 15, which will enable the user to scroll through the Task Table to obtain the requred TASK CODE 28. The user is also able to send all entries in the Task Table for a given client, identified by the user entering on the keypad 15 a TASK CODE 28 of 999 for a selected CLIENT CODE 20. Furthermore the user is also able to send all the of entries, for all clients, in the Task Table, identified by the user entering on the keypad 15 a CLIENT CODE 20 of 999 and a TASK CODE 28 of 999 combination.

Menu option '(3) DATA', enables the user to send all of the entries in the Data Table for a given client and task, by the user entering a specific CLIENT CODE 20 and a specific TASK CODE 28 combination on the keypad 15. The present invention prompts the user to enter a valid CLIENT CODE 20. At this stage the user can select the CLIENT key on the keypad 15, which will enable the user to scroll through the Client Table to obtain the required CLIENT CODE 20. Once a valid CLIENT CODE 20 has been entered by the user, the present invention prompts the user to enter a valid TASK CODE 28. At this stage the user can select the TASK key on the keypad 15, which will enable the user to scroll through the Task Table to obtain the required TASK CODE 28. The user is also able to send all of the entries in the Data Table for all the tasks of a given client, identified by the user entering on the keypad 15 a specific CLIENT CODE 20 and a TASK CODE 28 of 999. Furthermore the user can send all the entries, for all clients and all tasks in the Data Table, identified by the user entering on the keypad 15 a CLIENT CODE 20 of 999 and a TASK CODE 28 of 999 combination.

FIG. 6j illustrates the display 16 when the RECEIVE function key is selected on the keypad 15. This function allows the user to receive from a remote device via the communications interface 13 entries into the Client Table, Task Table and the Data Table. The received data is directly stored in the relevant tables by present invention, as if the user had individually stored each received entry into the said tables. The Communications Program sets up the communications link between the present invention and the remote device. Once communications has been successfully initialized, the following options appear in the display 16's bottom line 40;

Menu option '(1) CLIENT', enables the user to receive a single entry for the Client Table identified by the present invention receiving a packet of information from the remote computer, via the communications' interface 13, which contains a specific communications' function code of 550, a CLIENT CODE 20, CLIENT DESCRIPTION 21 and client COST LIMIT 24. The communications' function code is interpreted by the Communications Program, to store the received CLIENT CODE 20, CLIENT DESCRIPTION 21 and COST LIMIT 24 in the Client Table. The user can also receive multiple entries from the Client Table, identified by the present invention receiving a packet of information from the remote computer, via the communications' interface 13, which contains a specific communications' function code of 553, followed by multiple triplets of CLIENT CODEs 20, CLIENT DESCRIPTIONs 21 and COST LIMITs 24. The communications' function code, is interpreted by the Communications Program to store the received triplets of CLIENT CODEs 20, CLIENT DESCRIPTIONs 21 and COST LIMITs 24 in the Client Table. All revelant pointers in the Client Table record are updated (FIGS. 3a and 4a);

Menu option '(2) TASK', enables the user to receive a single entry for the Task Table identified by the present invention receiving a packet of information from the remote computer, via the communications' interface 13, which contains a specific communications' function code of 560, a CLIENT CODE 20, a TASK CODE 28, a TASK DESCRIPTION 29, a COST TYPE 30, a COST 31 and a COST LIMIT 32. The communications' function code is interpreted by the Communications Program to store the received TASK CODE 28, TASK DESCRIPTION 29, COST TYPE 30, COST 31 and COST LIMIT 32 in the Task Table under the received CLIENT CODE 20. The user can also receive multiple entries for the Task Table, identified by the present invention receiving a packet of information from the remote computer, via the communications' interface 13, which contains a specific communications' function code of 563, followed by multiple sets of CLIENT CODEs 20, TASK CODEs 28, TASK DESCRIPTIONs 29, COST TYPEs 30, COSTs 31 and COST LIMITs 32. The communications' function code, is interpreted by the Communications Program to store the received sets of TASK CODEs 28, TASK DESCRIPTIONs 29, COST TYPEs 30, COSTs 31 and COST LIMITs 32 in the Task Table under the received set's CLIENT CODE 20. All relevant pointers in the Client Table record (FIGS. 3a and 4a) are updated and all Task Table records are updated (FIGS. 3b, 4b and 5a);

Menu option '(3) DATA', enables the user to receive an entry or all entries to populate the Data Table for a given client and task. The function to receive a single entry into the Data Table, is identified by the present invention receiving a packet of information from the remote computer, via the communications' interface 13, which contains a specific communications' function code of 570, a CLIENT CODE 20, a TASK CODE 28, an AMOUNT 38 and a QUANTITY 39. The communications' function code is interpreted by the Communications Program to store the received AMOUNT 38 and QUANTITY 39 in the Data Table under the CLIENT CODE 20 and TASK CODE 28. The user can also receive multiple entries for the Data Table, identified by the present invention receiving a packet of information from the remote computer, via the communications' interface 13, which contains a specific communications' function code of 573, followed by multiple sets of CLIENT CODEs 20, TASK CODEs 28, AMOUNTs 39 and QUANTITYs 39. The communications' function code, is interpreted by the Communications Program to store the received pairs of AMOUNTs 39 and QUANTITYs 39 in the Data Table under the received CLIENT CODE 20 and TASK CODE 28. For both of these said functions the DATE TIME 37 field in the relevant Client Task Data record is set by the Communications Program when the AMOUNT 38 and QUANTITY 39 fields are entered into the said record. All relevant pointers in the Data Table records are updated (FIGS. 3c, 4c and 5b) and any effected Task Table records pointers are updated (FIGS. 3b, 4b and 5a).

Tables 3, 4, and 5 represent an example of a typical user's desired application of the present invention of the Client Table, Task Table and Data Table respectively. The application is for a plumber who travels to a clients' home to undertake repairs.

Tables 6, 7 and 8 represent the present invention's embodiment of the planned tables 3, 4 and 5. Tables 6, 7 and 8 illustrate the Client Table, Task Table and Data Table respectively as set out in the planned tables of 3, 4 and 5.

A description follows as how the user would enter all the planned information into the current invention:

TABLE 3

| | PLANNED CLIENT TABLE | |
|---|---|---|
| CLIENT CODE | CLIENT DESCRIPTION | COST LIMIT |
| 1 | M.Y. Zer 29 Hunter Ave Herndon #241-4121 | 0 |
| 2 | I.R. Ess 1413 Cherry Rd D.C. #365-5631 | 0 |

The user presses CLIENT key on the keypad 15. The CLIENT menu (FIG. 6a) appears on the display 16 and the user selects '1' on the keypad 15 to signify that a Client Table record needs to be entered. The user is prompted on the display 16:

CLIENT
Enter client code:
The user enters '1' as defined in table 3 column 1, line 1, followed by pressing the ENTER key. Since this CLIENT CODE 20 does not exist in the present Client Table, the user is then prompted on the display 16:

CLIENT
Enter client description:
The user enters 'M.Y. Zer 30 Hunter Ave Herndon #241-4121' via the keypad 15, as described in table 3 column 2, line 1, followed by pressing the ENTER key on the keypad 15. The user is prompted on the display 16:

CLIENT
Enter client cost limit:
The user enters 0 via the keypad 15, as described in table 3 column 3, line 1, followed by pressing the ENTER key on the keypad 15. A value of 0 is entered, because the user does not want to set a billing limit for this client. The user is then prompted on the display 16:

CLIENT
Enter client code:
The user enters '2' as defined in table 3 column 1, line 2, followed by pressing the ENTER key. Since this CLIENT CODE 20 does not exist in the present Client Table, the user is then prompted on the display 16:

CLIENT
Enter client description:

The user enters 'I.R. Ess 1413 Cherry R D.C. #365-5631' as described in table 3 column 2, line 2, followed by pressing the ENTER key on the keypad 15. The user has now entered all required clients into the Client Table. The user is now prompted on the display 16:

CLIENT

Enter client cost limit:

The user enters 0 via the keypad 15, as described in table 3 column 3, lne 2, followed by pressing the ENTER key on the keypad 15. A value of 0 is entered, because the user does not want to set a billing limit for this client. The user is then prompted on the display 16:

CLIENT

Enter client code:

Because the user has entered all the required clients into the Client Table, the user simply presses the ENTER key on the keypad 15 to signify the end of the CLIENT transaction.

TABLE 4

| | | PLANNED TASK TABLE | | | |
|---|---|---|---|---|---|
| CLIENT CODE | TASK CODE | TASK DESCRIPTION | COST | COST TYPE | COST LIMIT |
| 1 | 1 | Travel Time (O/H) | $30 | 1 | 0 |
| 1 | 2 | Labor - Faucet (O/H) | $30 | 3 | 0 |
| 1 | 3 | Faucet | $20 | 2 | 0 |
| 2 | 1 | Travel Time (A/H) | $45 | 1 | 0 |
| 2 | 2 | Blocked Toilet (A/H) | $55 | 3 | 0 |

The user presses the TASK key on the keypad 15. The TASK menu (FIG. 6b) appears on the display 16 and the user selects '1' on the keypad 15 to signify that a Task Table needs to be entered. The user is prompted:

TASK

Enter client code:

on the display 16. The user enters '1' as defined in table 4 column 1, line 1, followed by pressing the ENTER key. Since this CLIENT CODE 20 does exist in the present Client Table, the user is then prompted on the display 16:

TASK

Enter task code:

The user enters '1' as defined in table 4, column 2, line 1. Since this TASK CODE 28 does not exist in the present Task Table, no error message appears on the display 16 and the user is then prompted on the display 16:

TASK

Enter task description:

The user enters, via the keypad 15, 'Travel Time (O/H)' as described in table 3 column 3, line 1, followed by pressing the ENTER key on the keypad 15. The user is then prompted on the display 16:

TASK

Enter cost type:

If the user is not sure as to which COST TYPE 30 code that must be entered, the user can obtain a display of the available COST TYPE 30 codes by entering '−1' on the keypad 15. The user is then able to scroll through the list by using the NEXT and PRVS keys on the keypad 15. The COST TYPE 30 code for table 4, column 4, line 1 is '1', which the user enters on the keypad 15, followed by the ENTER key. The user is then prompted on the display 16:

TASK

Enter cost $:

The user enters '30.00' as defined in table 4, column 4 line 1, followed by pressing the ENTER key. The user is then prompted on the display 16:

CLIENT

Enter task cost limit:

The user enters 0 via the keypad 15, as described in table 4 column 6, line 1, followed by pressing the ENTER key on the keypad 15. A value of 0 is entered, because the user does not want to set a billing limit for this client. The first entry into the Task Table 10) is now complete for a CLIENT CODE 20 of '1' and a TASK CODE 28 of '1'. The user is now prompted on the display 16:

TASK

More for client code 1?

The user enters 'Y' on the keypad 15 to signify that there are more entries for CLIENT CODE 20 '1' to be entered into the Task Table. The user is then prompted on the display 16:

TASK

Enter task code:

Assuming that the user entered '1', instead of '2' for the TASK CODE 28, an error message would appear on the display 16 for 10 seconds:

TASK

*ERROR* task code 1 exists.

The display 16 now prompts the user:

TASK

Enter task code:

but this message is now blinked on and off to signify that an error had occurred during the initial entry of a TASK CODE 28. If the user did not read the error message correctly, the user can reread the error message by selecting the PRVS key on the keypad 15. Once the user has entered a valid TASK CODE 28, .i.e. '2', the user is prompted on the display 16:

TASK

Enter task description:

The user enters 'Labor—Faucet (O/H)' as described in table 3 column 2, line 2, followed by pressing the ENTER key on the keypad 15. The user is then prompted on the display 16:

TASK

Enter cost type:

The user enters '3' followed by the ENTER key, which is the COST TYPE 30 code for table 4, column 4, line 2. The user is then prompted on the display 16:

TASK

Enter cost $:

The user enters '30.00' as defined in table 4, column 4 line 2, followed by pressing the ENTER key. The user is then prompted on the display 16:

CLIENT

Enter task cost limit:

The user enters 0 via the keypad 15, as described in table 4 column 6, line 2, followed by pressing the ENTER key on the keypad 15. A value of 0 is entered, because the user does not want to set a billing limit for this client. The second entry into the Task Table is now complete for a CLIENT CODE 20 of '1' and a TASK CODE 28 of '2'. The user is now prompted on the display 16:

TASK

More for client code 1?

The user would enter 'Y' on the keypad 15 to signify that there are more entries for CLIENT CODE 20 '1'

Task Table. The user is then prompted on the display 16:

TASK
Enter task code:

The user enters '3' as described in column 2, line 3 of table 4. Because this entered TASK CODE 28 does not currently exist in the client's Task Table, the user is prompted on the display 16:

TASK
Enter task description:

The user enters 'Faucet' as described in table 3 column 3, line 3, followed by pressing the ENTER key on the keypad 15. The user is then prompted on the display 16:

TASK
Enter cost type:

The user enters '2' followed by the ENTER key, which is the COST TYPE 30 code for table 4, column 4, line 3. The user is then prompted on the display 16:

TASK
Enter cost $:

The user '20.00' as defined in table 4, column 4 line 3, followed by pressing the ENTER key. The user is then prompted on the display 16:

CLIENT
Enter task cost limit:

The user enters 0 via the keypad 15, as described in table 4 column 6, line 3, followed by pressing the ENTER key on the keypad 15. The third and final entry into the Task Table is now complete for a CLIENT CODE 20 '1'. The user is now prompted on the display 16:

TASK
More for client code 1?

The user enters 'N' on the keypad 15 to signify that there are no more entries for the Task Table for a CLIENT CODE 20 of '1'. The user is prompted on the display 16:

TASK
Enter client code:

The user enters '2' as defined in table 4 column 1, line 5, followed by pressing the ENTER key. Since this CLIENT CODE 20 does exist in the present Client Table, the user is then prompted:

TASK
Enter task code:

The user enters '1' as defined in table 4, column 2, line 5. Since this TASK CODE 28 is valid for the Task Table, no error message appears and the user is prompted on the display 16:

TASK
Enter task description:

The user enters 'Travel Time (A/H)' as described in table 3 column 3, line 5, followed by pressing the ENTER key on the keypad 15. The user is then prompted on the display 16:

TASK
Enter cost type:

The COST TYPE 30 code for table 4, column 4, line 5 is '1', which the user enters, followed by the ENTER key. The user is then prompted on the display 16:

TASK
Enter cost $:

The user enters '45.00' as defined in table 4 column 4 line 5, followed by pressing the ENTER key. The user is then prompted on the display 16:

CLIENT
Enter task cost limit:

The user enters 0 via the keypad 15, as described in table 4 column 6, line 4, followed by pressing the ENTER key on the keypad 15. The first entry into the Task Table, a CLIENT CODE 20 of '2' and a TASK CODE 28 of '1'. The user is now prompted on the display 16:

TASK
More for client code 2?

The user would enter 'Y' on the keypad 15 to signify that there are more entries for CLIENT CODE 20 '2' Task Table. The user is then prompted on the display 16:

TASK
Enter task code:

The user enters '2' as defined in table 4, column 2, line 6. Since this TASK CODE 28 is valid for the Task Table, no error message appears and the user is prompted on the display 16:

TASK
Enter task description:

The user enters 'Blocked Toilet (A/H)' as described in table 3 column 3, line 6, followed by pressing the ENTER key on the keypad 15. The user is then prompted on the display 16:

TASK
Enter cost type:

The COST TYPE 30 code for table 4, column 4, line 6 is '3', which the user enters, followed by the ENTER key. The user is then prompted on the display 16:

TASK
Enter cost $:

The user enters '55.00' as defined in table 4, column 4 line 6, followed by pressing the ENTER key. The user is then prompted on the display 16:

CLIENT
Enter task cost limit:

The user enters 0 via the keypad 15, as described in table 4 column 6, line 5, followed by pressing the ENTER key on the keypad 15. The second and final entry into the Task Table of CLIENT CODE 20 of '2' is now entered. The user is now prompted on the display 16:

TASK
More for client code 2?

The user enters 'N' on the keypad 15 to signify that there are no more entries for CLIENT CODE 20 '2' Task Table. The user is prompted on the display 16:

TASK
Enter client code:

The user presses the ENTER key on the keypad 15 to terminate the current 'TASK' transaction.

TABLE 5

| | PLANNED DATA TABLE | | | |
|---|---|---|---|---|
| CLIENT CODE | TASK CODE | DATE | TIME | FUNCTION |
| 1 | 1 | 061988 | 11:30 | start travel |
| 1 | 2 | 061988 | 12:00 | start job |
| 1 | 2 | 061988 | 13:00 | stop for lunch |
| 1 | 2 | 061988 | 14:00 | re-start job |
| 1 | 3 | 061988 | 14:10 | 2 faucets |
| 1 | 2 | 061988 | 15:30 | job finished |
| 2 | 1 | 071988 | 19:00 | start travel |
| 2 | 2 | 071988 | 19:30 | start job |
| 2 | 2 | 071988 | 20:00 | job finished |

This table would be entered by the user before and whilst on the job. Before leaving the office at 11.30 a.m., the plumber in this example, would press the DATA key on the keypad 15. The DATA menu (FIG. 6c) appears on the display 16 and the user selects '1' on the keypad 15 to signify that an entry into a client's Task Data Table needs to be entered. The user is prompted:

\*\*DATA\*\*
Enter client code:

on the display 16. The user enters 1 as defined in table 5 column 1, line 1, followed by the ENTER key. Since this CLIENT CODE 20 does exist in the present Client Table, the user is then prompted on the display 16:

\*\*DATA\*\*
Enter task code:

The user enters 1 ENTER as defined in table 5, column 2, line 1. Since this TASK CODE 28 does exist in the present client's Task Table, no error message appears on the display 16. The user's intended function, 'start travel' as defined in table 5, column 4, line 1, corresponds to this client's TASK CODE 28 of '1', i.e. 'Travel Time (O/H)' as entered previously by the user. The DATE TIME 37 in table 5, column 3, line 1 is automatically updated by the present invention's clock & calendar update 3 circuit.

The user then travels to client's site and before starting to repair the client's faucet, presses the DATA key on the keypad 15. The DATA menu (FIG. 6c) appears on the display 16 and the user selects 1 on the keypad 15 to signify that an entry into a client's Data Table needs to be entered. The user is prompted:

\*\*DATA\*\*
Enter client code:

on the display 16. The user enters 1 ENTER as defined in table 5 column 1 line. Since this CLIENT CODE 20 does exist in the present Client Table, the user is then prompted on the display 16:

\*\*DATA\*\*
Enter task code:

The user enters 2 ENTER as defined in table 5, column 2, line 2. Since this TASK CODE 28 does exist in the present client's Task Table, no error message appears on the display 16. This said task code corresponds to this client's TASK CODE 28 of '2', i.e. 'Labor-Faucet (O/H)' as entered previously by the user. The DATE TIME 37 in table 5, column 3, line 1 is automatically updated by the present invention's clock & calendar update 3 circuit. Because this task is billed by time, the user is then prompted on the display 16:

\*\*DATA\*\*
Press START CLOCK:

The user then presses the START CLOCK key on the keypad 15 at 12.00 p.m. and then starts repairing the client's faucet. The present invention keeps track of the time currently being spent on repairing the client's faucet by incrementing, every minute, the QUANTITY 39 field in the current client's Data Table record. At 1.00 p.m., the user wants to break for lunch. The user presses the STOP CLOCK key on the keypad 15. The user is prompted on the display 16:

\*\*DATA\*\*
Enter suspend (1) or stop (2):

The user selects 1 on the keypad. This informs the present invention that billing of the current client's task is to be suspended until further notice. The user can then go off and eat lunch, or use the invention for another task-either for the same client, or a different client. At 2.00 p.m. the user returns from lunch and resumes repairing the client's faucet. Before resuming work, the client presses on the RE-CLOCK key on the keypad 15. The present invention then continues with the client's billing cycle, that was started at 12.00 p.m. and suspended at 1.00 p.m., i.e. the QUANTITY 39 field is once again updated for this particular client's task. At 2.0 p.m. The user installs two faucets. The user presses the DATA key on the keypad 15. The DATA menu (FIG. 6c) appears on the display 16 and the user selects 1 on the keypad 15 to signify that an entry into a client's Data Table needs to be entered. The user is prompted:

\*\*DATA\*\*
Enter client code:

on the display 16. The user enters 1 as defined in table 5 column 1, line 5, followed by the ENTER key. Since this CLIENT CODE 20 does exist in the present Client Table, the user is then prompted on the display 16:

\*\*DATA\*\*
Enter task code:

The user enters 3 ENTER as defined in table 5, column 2, line 5. Since this TASK CODE 28 does exist in the present client's Task Table, no error message appears on the display 16. The user's intended function, '2 faucets' as defined in table 5, column 4 line 5, corresponds to this client's TASK CODE 28 of '3', i.e. 'Faucet' as entered previously by the user. The user is then prompted on the display 16:

\*\*TASK\*\*
Enter quantity:

The user enters 2 on the keypad 15 to reflect the fact that two new faucets were used for the current client. The DATE TIME 37 in table 5, column 3, line 5 is automatically updated by the present invention's clock & calendar update 3 circuit. Note that during this data entry, the present invention continues to bill the present client by time, because the user did not press the STOP CLOCK key on the keypad 15 to suspend billing. At 3.30 p.m. the user finishes repairing the client's faucets. The user informs the present invention to stop billing by selecting the STOP CLOCK key on the keypad 15. The user is prompted on the display 16:

\*\*DATA\*\*
Enter suspend (1) or stop (2):

The user selects 2 on thekeypad. This terminates the current billing for client '1'. The user then returns to the office.

From an illustrative point of view, assume that the user does not land another job until the following month, i.e. 07-19-88 as described in table 5, lines 8 through 10. Before leaving the office at 7.00 p.m., the plumber in this example, would press the DATA key on the keypad 15. The DATA menu (FIG. 6c) appears on the display 16 and the user selects 1 on the keypad 15 to signify that an entry into a client's Data Table needs to be entered. The user is prompted:

\*\*DATA\*\*
Enter client code:

on the display 16. The user enters 2 as defined in table 5 column 1, line 8, followed by the ENTER key. Since this CLIENT CODE 20 does exist in the present Client Table, the user is then prompted on the display 16:

\*\*DATA\*\*
Enter task code:

The user enters 1 ENTER as defined in table 5, column 2, line 8. Since this TASK CODE 28 does exist in the present client's Task Table, no error message appears on the display 16. The user's intended function, 'start travel' as defined in table 5, column 4, line 8, corresponds to this client's TASK CODE 28 of '1', i.e. 'Travel Time (A/H)' as entered previously by the user. The DATE TIME 37 in table 5, column 3, line 8 is automatically updated by the present invention's clock & calendar update 3 circuit.

The user then travels to client's site and before starting to repair the client's faucet, presses the DATA key on the keypad 15. The DATA menu (FIG. 6c) appears on the display 16 and the user selects 1 on the keypad 15 to signify that an entry into a client's Data Table needs to be entered. The user is prompted:
DATA
Enter client code:
on the display 16. The user enters 2 as defined in table 5 column 1, line 9, followed by the ENTER key. Since this CLIENT CODE 20 does exist in the present Client Table, the user is then prompted on the display 16:
DATA
Enter task code:
The user enters 2 ENTER as defined in table 5, column 2, line 9. Since this TASK CODE 28 does exist in the present client's Task Table, no error message appears on the the display 16. This said task code corresponds to this client's TASK CODE 28 of '2', i.e. 'Blocked Toilet (A/H)' as entered previously by the user. The DATE TIME 37 in table 5, column 3, line 8 is automatically updated by the present invention's clock & calendar update 3 circuit. Because this task is billed on time, the user is then prompted on the display 16:
DATA
Press START CLOCK:
The user then presses the START CLOCK key on the keypad 15 at 7.30 p.m. and then starts unblocking the client's toilet. The present invention keeps track of the time currently being spent on unblocking the client's toilet by incrementing, every minute, the QUANTITY 39 field in the current client's Data Table record. At 8.00 p.m., the user completes the job at hand. The user presses the STOP CLOCK key on the keypad 15. The user is prompted on the display 16:
DATA
Enter suspend (1) or stop (2):
The user selects '2' on the keypad. This informs the present invention that billing of the current client's task is to be terminated. The user returns home.

seen that this said pointer points to the first record of this client in the Task Table, line 1 table 7.

The second field in this client's Client Table record is the CLIENT CODE 20 as indicated in column 4, line 1 table 6. This field contains the value of 1 as desired in the planned Client Table, line 1 table 3.

The third field of this said record, is the CLIENT DESCRIPTION 21, shown in column 5, line 1 table 6. This field holds the following character string; 'M. Y. Zer 30 Hunter Ave Herndon #241-4121' as required in table 3, column 2 line 1.

The fourth field in this client's Client Table record is the POINTER NEXT CLIENT 22. As illustrated in column 6, line 1 table 6, this field holds a value of 501B hexadecimal and points to the second record in this user's Client Table, line 2 table 6. This pointer is only set when the second entry into this Client Table is entered-line 2 table 6.

The fifth field in this first client's Client Table record, is the Pointer PRVS CLIENT 23. Because no previous entry existed in the current Client Table, as defined in table 3, this value is set to 0000 hexadecimal by the Table Maintenance Program and is used by the present embodiment to delimit the starting boundary of the Client Table as stored in RAM3 10.

The last field in this first client's Client Table record, is the client's COST LIMIT 24. As illustrated in column 8, line 1 table 6, this field holds a value of 0, as defined in the planned Client Table of table 3. This value notifies the Table Maintenance Program, that it is not to obtain a running total whenever data is entered into Data Table and to consequently not check if a spending limit has been reached for this particular client.

The second and final record entry into the Client Table is stored in a block of memory starting at hexadecimal address 501B (column 1, line 2 table 6) and ends at hexadecimal address 5053 (column 2, line 2 table 6). The start address was calculated by the address hashing algorithm, which is part of the Table Maintenance Program, based upon the CLIENT CODE 20 of 2 (column 4, line 2 table 6) as required in column 1, line 2 table 3.

The first field in this Client Table record is the

TABLE 6

| | | | STORED CLIENT TABLE | | | | |
|---|---|---|---|---|---|---|---|
| START ADDR | END ADDR | POINTER 1ST TASK | CLIENT CODE | CLIENT DESCR. | POINTER NEXT CLIENT | POINTER PRVS CLIENT | COST LIM. |
| 5000H | 501AH | 6000H | 1 | M.Y... | 501BH | 0000H | 0 |
| 501BH | 5053H | 605AH | 2 | I.R... | 0000H | 5000H | 0 |

This diagram illustrates the present invention's embodiment of the planned Client Table as laid out in table 3.

The first entry in the Client Table, for a CLIENT CODE 20 of 1, is stored in a block of memory starting at hexadecimal address 5000 (column 1 line 1 table 6) and ends at hexadecimal address 501A (column 2, line 1 table 6). The start address was calculated by the address hashing algorithm, which is part of the Table Maintenance Program, based upon the CLIENT CODE 20 of 1 (column 4, line 1 table 6) as required in column 1, line 1 table 3.

The first field in this Client Table record is the POINTER 1ST TASK 19 as ilustrated in column 3, line 1 table 6. This value was initialized to 6000 hexadecimal only after the user had entered the first task (line 1 table 4) for this client into the Task Table, table 7. It can be POINTER 1ST TASK 19 as illustrated in column 3, line 2 table 6. This value was initialized to 605A hexadecimal only after the user had entered the first task (line 5 table 4) for this client into the Task Table, table 7. It can be seen that this said pointer points to the first record of this client in the Task Table, line 5 table 7.

The second field in this client's Client Table record is the CLIENT CODE 20 as indicated in column 4, line 2 table 6. This field contains the value of 2 as desired in the planned Client Table, line 2 table 3.

The third field of this said record, is the CLIENT DESCRIPTION 21, shown in column 5, line 2 table 6. This said field holds the following character string; 'I.R. Ess 1413 Cherry Rd. D.C. #365-5631' as required in table 3, column 2 line 2.

The fourth field in this client's Client Table record is the POINTER NEXT CLIENT 22. As illustrated in column 6, line 2 table 6, this field holds a value of 0000 hexadecimal and is set by the Table Maintenance Program. It is used by the present embodiment to delimit the end boundary of the Client Table as stored in RAM3 10.

The fifth field in this second client's Client Table record, is the POINTER PRVS CLIENT 23. As illustrated in column 7, line 2 table 6, a value of 5000 hexadecimal is stored in this field. This said field points back to the previous entry in the Client Table. In this illustration of the use of the preferred embodiment of the present invention, the previous record in the Client Table is the first record entered into this said table and is described on line 1 table 6.

The last field in this second client's Client Table record, is the client's COST LIMIT 24. As illustrated in column 8, line 2 table 6, this field holds a value of 0, as defined in the planned Client Table of table 3.

this specific client's task, as desired in table 4 line 1. A COST TYPE 30 of value 1 is recognized by the present invention's embodiment as a single valued cost billing structure, as defined in FIG. 5b.

The sixth field of this client's first Task Table record is COST 31, as illustrated in column 8, line 1 table 7. This said field contains a decimal value of 30.00, which together with a COST TYPE 30 of 1, implies that this task is to be billed at a flat rate of $30.00.

The last field in this client's first Task Table record, is the client's COST LIMIT 32. As illustrated in column 9, line 1 table 7, this field holds a value of 0, as defined in the planned Task Table of table 4.

The second entry into the Task Table, for a CLIENT CODE 20 of 1, is stored in a block of memory starting at hexadecimal address 601E (column 1, line 2 table 7) and ends at hexadecimal address 603B (column 2, line 2 table 7). The start address was calculated by the address

TABLE 7

| | | | STORED TASK TABLE | | | | | |
|---|---|---|---|---|---|---|---|---|
| START ADDR | END ADDR | POINTER 1ST DATA | POINTER NEXT TASK | TASK CODE | TASK DESCR. | COST TYPE | COST | COST LIM. |
| 6000H | 601DH | 9000H | 601EH | 1 | Trav.. | 1 | 30 | 0 |
| 601EH | 603BH | 9009H | 603CH | 2 | Labo.. | 3 | 30 | 0 |
| 603CH | 6059H | 9011H | 0000H | 3 | Fauc.. | 2 | 20 | 0 |
| 605AH | 6077H | 9019H | 6078H | 1 | Trav.. | 1 | 45 | 0 |
| 6078H | 6095H | 9021H | 0000H | 2 | Bloc.. | 3 | 55 | 0 |

This diagram illustrates the present invention's embodiment of the planned Task Table as laid out in table 4.

The first entry into the Task Table, for a CLIENT CODE 20 of 1, is stored in a block of memory starting at hexadecimal addess 6000 (column 1, line 1 table 7) and ends at hexadecimal address 601D (column 2, line 1 table 7). The start address was calculated by the address hashing algorithm, which is part of the Table Maintenance Program, based upon the CLIENT CODE 20 of 1 and a TASK CODE 28 of 1, as required in line 1 table 4.

The first field in this client's first Task Table record is the POINTER 1ST DATA 25 as illustrated in column 3, line 1 table 7. This value was initialized to 9000 hexadecimal only after the user had entered the first datum (line 1 table 5) for this client's first task into the Data Table, table 8. It can be seen that this said pointer points to the first record of this client in the Data Table.

The second field in this client's first Task Table record is the POINTER NEXT TASK 26. As illustrated in column 4, line 1 table 7, this field holds a value of 601E hexadecimal and points to the second record in this user's Task Table, line 2 table 7. This said pointer is only set when the second entry into this Task Table is entered-line 2 table 7.

The third field in this client's first Task Table record is the TASK CODE 28 as indicated in column 5, line 1 table 7. This field contains the value of 1 as desired in the planned Task Table, line 1 table 4.

The fourth field of this said record, is the TASK DESCRIPTION 29, shown in column 6, line 1 table 7. This said field holds the following character string; 'Travel Time (O/H)' as required in table 4, column 3 line 1.

The fifth field of this client's first Task Table record is COST TYPE 30, as illustrated in column 7, line 1 table 7. This said field contains a value of 1, which was selected by the user to describe the type of billing for hashing algorithm based upon the CLIENT CODE 20 of 1 and a TASK CODE 28 of 2, as required in line 2 table 4.

The first field in this client's second Task Table record is the POINTER 1ST DATA 25 as illustrated in column 3, line 2 table 7. This value was initialized to 9009 hexadecimal only after the user had entered the second datum (line 2 table 5) for this client's second task into the Data Table, table 8. It can be see that this said pointer points to the second record of this client in the Data Table.

The second field in this client's second Task Table record is the POINTER NEXT TASK 26. As illustrated in column 4, line 2 table 7, this field holds a value of 603C hexadecimal and points to the third record in this user's Task Table, line 3 table 7. This said pointer is only set when the third entry into this Task Table is entered-line 3 table 7.

The third field in this client's second Task Table record is the TASK CODE 28 as indicated in column 5, line 2 table 7. This field contains the value of 2 as desired in the planned Task Table, line 2 table 4.

The fourth field of this said record, is the TASK DESCRIPTION 29, shown in column 6, line 2 table 7. This said field holds the following character string; 'Labor-Faucet (O/H)' as required in table 4, column 3 line 2.

The fifth field of this client's second Task Table record is COST TYPE 30, as illustrated in column 7, line 2 table 7. This said field contains a value of 3, which was selected by the user to describe the type of billing for this specific client's task, as desired in table 4 line 2. A COST TYPE 30 of value 3 is recognized by the present invention's embodiment as a per hour cost billing structure, as defined in FIG. 4b.

The sixth field of this client's second Task Table record is COST 31, as illustrated in column 8, line 2 table 7. This said field contains a decimal value of 30.00, which together with a COST TYPE 30 of 3, implies that this task is to be billed at $30.00 per hour.

The last field in this client's second Task Table record, is the client's COST LIMIT 32. As illustrated in column 9, line 2 table 7, this field holds a value of 0, as defined in the planned Task Table table 4.

The third and final entry into the Task Table, for a CLIENT CODE 20 of 1, is stored in a block of memory starting at hexadecimal address 603C (column 1, line 3 table 7) and ends at hexadecimal address 6059 (column 2, line 3 table 7). The start address was calculated by the address hashing algorithm based upon the CLIENT CODE 20 of 1 and a TASK CODE 28 of 3, as required in line 3 table 4.

The first field in this client's third Task Table record is the POINTER 1ST DATA 25 as illustrated in column 3, line 3 table 7. This value was initialized to 9011 hexadecimal only after the user had entered the fifth datum (line 3 table 5) for this client's third task into the Data Table, table 8. It can be seen that this said pointer points to the third record of this client in the Data Table.

The second field in this client's third Task Table record is the POINTER NEXT TASK 26. As illustrated in column 4, line 3 table 7. This field holds a value of 0000 hexadecimal and signifies the end of this user's Task Table. The third field in this client's third Task Table record is the TASK CODE 28 as indicated in column 5, line 3 table 7. This field contains the value of 3 as desired in the planned Task Table, line 3 table 4.

The fourth field of this said record, is the TASK DESCRIPTION 29, shown in column 6, line 3 table 7. This said field holds the following character string; 'Faucet' as required in table 4, column 3 line 3.

The fifth field of this client's third Task Table record is COST TYPE 30, as illustrated in column 7, line 3 table 7. This said field contains a value of 2, which was selected by the user to describe the type of billing for this specific client's task, as desired in table 4 line 3. A COST TYPE 30 of value 2 is recognized by the present invention's embodiment as a per item cost billing structure, as defined in FIG. 3b.

The sixth field of this client's third Task Table record is COST 31, as illustrated in column 8, line 3 table 7. This said field contains a decimal value of 20.00, which together with a COST TYPE 30 of 3, implies that this task is to be billed at $20.00 per item.

The last field in this client's third Task Table record, is the client's COST LIMIT 32. As illustrated in column 9, line 3 table 7, this field holds a value of 0, as defined in the planned Task table of table 4.

The first entry into the Task Table, for a CLIENT CODE 20 of 2, is stored in a block of memory starting at hexadecimal address 605A (column 1, line table 7) and ends at hexadecimal address 6077 (column 2, line 5 table 7). The start address was calculated by the address hashing algorithm based upon the CLIENT CODE 20 of 2 and a TASK CODE 28 of 1, as required in line 5 table 4.

The first field in this client's first Task Table record is the POINTER 1ST DATA 25 as illustrated in column 3, line 5 table 7. This value was initialized to 9019 hexadecimal only after the user had entered the first datum (line 8 table 5) for this client's first task into the Data Table, table 8. It can be seen that this said pointer points to the first record of this client in the Data Table, line 4 table 8.

The second field in this client's first Task Table record is the POINTER NEXT TASK 26. As illustrated in column 4, line 5 table 7, this field holds a value of 6078 hexadecimal and points to the second record in this user's Task Table, line 6 table 7. This said pointer is only set when the second entry into this Task Table is entered.

The third field in this client's first Task Table record is the TASK CODE 28 as indicated in column 5, line 5 table 7. This field contains the value of 1 as desired in the planned Task Table, line 5 table 4.

The fourth field of this said record, is the TASK DESCRIPTION 29, shown in column 6, line 5 table 7. This said field holds the following character string; 'Travel Time (A/H)' as required in table 4, column 3 line 5.

The fifth field of this client's first Task Table record is COST TYPE 30, as illustrated in column 7, line 5 table 7. This said field contains a value of 1, which was selected by the user to describe the type of billing for this specific client's task, as desired in table 4 line 5. A COST TYPE 30 of value 1 is recognized by the present invention's embodiment as a single valued cost billing structure, as defined in FIG. 5b.

The sixth field of this client's first Task Table record is COST 31, as illustrated in column 8, line 5 table 7. This said field contains a decimal value of 45.00, which together with a COST TYPE 30 of 1, implies that this task is to be billed at a flat rate of $45.00.

The last field in this client's first Task Table record, is the client's COST LIMIT 32. As illustrated in column 9, line 5 table 7, this field holds a value of 0, as defined in the planned Task Table of table 4.

The second entry into the Task Table, for a CLIENT CODE 20 of 2, is stored in a block of memory starting at hexadecimal address 6078 (column 1, line 6 table 7) and ends at hexadecimal address 6095 (column 2, line 6 table 7). The start address was calculated by the address hashing algorithm based upon the CLIENT CODE 20 of 2 and a TASK CODE 28 of 2, as required in line 6 table 4.

The first field in this client's second Task Table record is the POINTER 1ST DATA 25 as illustrated in column 3, line 6 table 7. This value was initialized to 9021 hexadecimal only after the user had entered the second datum (line 9 table 5) for this client's second task into the Data Table, table 8. It can be seen that this said pointer points to the second record of this client in the Data Table, line 5 table 8.

The second field in this client's second Task Table record is the PONTER NEXT TASK 26. As illustrated in column 4, line 6 table 7. This field holds a value of 0000 hexadecimal and signifies the end of this user's Task Table.

The third field in this cient's second Task Table record is the TASK CODE 28 as indicated in column 5, line 6 table 7. This field contains the value of 2 as desired in the planned Task Table, line 6 table 4.

The fourth field of this said record, is the TASK DESCRIPTION 29, shown in column 6, line 6 table 7. This said field holds the following character string; 'Blocked Toilet (A/H)' as required in table 4, column 3 line 6.

The fifth field of this client's second Task Table record is COST TYPE 30, as illustrated in column 7, line 6 table 7. This said field contains a value of 3, which was selected by the user to describe the type of billing for this specific client's task, as desired in table 4 line 6. A COST TYPE 30 of value 3 is recognized by the present invention's embodiment as a per hour cost billing structure, as defined in FIG. 4b.

The sixth field of this client's second Task Table record is COST 31, as illustrated in column 8, line 6 table 7. This said field contains a decimal value of 55.00, which together with a COST TYPE 30 of 3, implies that this task is to be billed at $55.00 per hour.

The last field in this client's second Task Table record, is the client's COST LIMIT 32. As illustrated in column 9, line 6 table 7, this field holds a value of 0, as defined in the planned Task Table of table 4.

The fifth field of this client's first Data Table record is the DATE TIME 37 field as described in column 7, line 1 table 8. An encoded value of 061988 (date) and 1130 (time) is stored in this field by the present invention.

The sixth field of this client's first Data Table record is AMOUNT 38, as illustrated in column 8, line 1 table 8. A decimal value of 30.00 is stored in this field, which reflects the total billable amount for the first client's first task as entered in line 1 table 5.

The seventh and last field of this client's first Data Table record is the QUANTITY 39 field, as illustrated

TABLE 8

| | | STORED DATA TABLE | | | | | | |
|---|---|---|---|---|---|---|---|---|
| START ADDR | END ADDR | PNTR TASK DESC | PNTR SAME TASK | PNTR NEXT DATE | PNTR PRVS DATE | DATE TIME | AMNT | QNTY |
| 9000H | 9008H | 6000H | 0000H | 9009H | 0000H | 061988 1130 | 30.00 | 0.0 |
| 9009H | 9010H | 601EH | 0000H | 9011H | 9000H | 061988 1200 | 75.00 | 2.5 |
| 9011H | 9018H | 603CH | 0000H | 0000H | 9009H | 061988 1410 | 40.00 | 2.0 |
| 9019H | 9020H | 605AH | 0000H | 9021H | 0000H | 071988 1900 | 45.00 | 0.0 |
| 9021H | 9028H | 6078H | 0000H | 0000H | 9019H | 071988 1930 | 27.50 | 0.5 |

This diagram illustrates the present invention's embodiment of the planned Data Table as laid out in table 5.

The first entry in the Task Table, for a CLIENT CODE 20 of 1, is stored in a block of memory starting at hexadecimal address 9000 (column 1, line 1 table 8) and ends at hexadecimal address 9008 (column 2, line 1 table 8). The start address was calculated by the address hashing algorithm, which is part of the Table Maintenance Program, based upon the CLIENT CODE 20 of 1, a TASK CODE 28 of 1 and the DATE TIME 37 when the entry was made (column 7, line 1 table 8), as required in line 1 table 5.

The first field in this client's first Data Table record is the POINTER TASK DESC 33 as illustrated in column 3, line 1 table 8. This value was initialized to 6000 hexadecimal, after the user had entered the task into the Task Table. It can be seen that this said pointer points to the first record of this client in the Task Table, line 1 table 7. This field identifies the data in the record with the task in the Task Table, i.e. TASK CODE 28 of value 1.

The second field in this client's first Data Table record is the POINTER SAME TASK 34. As illustrated in column 4, line 1 table 8, this field holds a value of 0000 hexadecimal. The present embodiment of the invention interprets this value such that the current record is the only data record for the client's task pointed to, by the POINTER TASK DESC 33 field in column 3, line 1 table 8.

The third field in this client's first Data Table record is the POINTER NEXT DATE 35 as indicated in column 5, line 1 table 8. This field contains the value of 9009 hexadecimal. It can be seen in table 8, that this pointer points to the next entry in the Client task Data Table for this client, i.e. line 2 table 8.

The fourth field of this said record, is the POINTER PRVS DATE 36 as shown in column 6, line 1 table 8. This said field holds the value of 0000 hexadecimal. The Table Maintenance Program interprets this as the first record entered into the first client's Data Table.

in column 9, line 1 table 8. This field contains a value of 0, because of the nature of this record's task, as pointed to by the POINTER TASK DESC 33 in column 3, line 1 table 8.

The second entry into the Task Table, for a CLIENT CODE 20 of 1, is stored in a block of memory starting at hexadecimal address 9009 (column 1, line 2 table 8) and ends at hexadecimal address 9010 (column 2, line 2 table 8). The start address was calculated by the address hashing algorithm based upon the CLIENT CODE 20 of 1, a TASK CODE 28 of 2 and the DATE TIME 37 when the entry was made (column 7, line 2 table 8), as required in line 2 table 5.

The first field in this client's second Data Table record is the POINTER TASK DESC 33 as illustrated in column 3, line 2 table 8. This value was initialized to 601E hexadecimal. It can be seen that this said pointer points to the second record of this client in the Task Table, line 2 table 7. This field identifies the data in the record with the task in the Task Table, i.e. TASK CODE 28 of value 2.

The second field in this client's second Data Table record is the POINTER SAME TASK 34. As illustrated in column 4, line 2 table 8, this field holds a value of 0000 hexadecimal. The present embodiment of the invention interprets this value as that the current record is the only data record for the client's task pointed to, by the POINTER TASK DESC 33 field in column 3, line 2 table 8.

The third field in this client's second Data Table record is the POINTER NEXT DATE 35 as indicated in column 5, line 2 table 8. This field contains the value of 9011 hexadecimal. It can be seen in table 8, that this pointer points to the next consecutive entry in the Data Table for this client, i.e. line 3 table 8.

The fourth field of this said record, is the POINTER PRVS DATE 36 as shown in column 6, line 2 table 8. This field holds a value of 9000 hexadecimal and it can be seen that it points to the first data entry record for the first client (line 1 table 8).

The fifth field of this client's second Data Table record is the DATE TIME 37 field as described in column 7, line 2 table 8. An encoded value representative of 061988 (date) and 1200 (time) is stored in this field by the present invention.

The sixth field of this client's second Data Table record is AMOUNT 38, as illustrated in column 8, line 2 table 8. A decimal value of 75.00 is stored in this field, which reflects the total billable amount for the first client's second task as entered in line 2 table 5. This is a per hour calculated value, using the accumulated billable time (AMOUNT 38) stored in the AMOUNT field (column 9 line 2) and the COST 31 value stored in the Task Table, record two (line 2 table 7).

The seventh and last field of this client's second Data Table record is the QUANTITY 39 field, as illustrated in column 9, line 2 table 8. This field contains a decimal value of 2.5 and reflects the total time in hours spent on this given task as defined in lines 2, 3, 4 and 6 in table 5.

The third record entry into the Task Table, for a CLIENT CODE 20 of 1, is stored in a block of memory starting at hexadecimal address 9011 (column 1, line 3 table 8) and ends at hexadecimal address 9018 (column 2, line 3 table 8). The start address was calculated by the address hashing algorithm based upon the CLIENT CODE 20 of 1, a TASK CODE 28 of 3 and the DATE TIME 37 when the entry was made (column 7, line 3 table 8), as required in line 5 table 5.

The first field in this client's third Data Table record is the POINTER TASK DESC 33 as illustrated in column 3, line 3 table 8. This value was initialized to 603C hexadecimal. It can be seen that this said pointer points to the third record of this client in the Task Table, line 3 table 7. This field identifies the data in the record with the task in the Task Table, i.e. TASK CODE 28 of value 3.

The second field in this client's third Data Table record is the POINTER SAME TASK 34. As illustrated in column 4, line 3 table 8, this field holds a value of 0000 hexadecimal. The present embodiment of the invention interprets this value as that the current record is the only data record for the client's task pointed to by the POINTER TASK DESC 33 field in column 3, line 3 table 8.

The third field in this client's third Data Table record is the POINTER NEXT DATE 35 as indicated in column 5, line 3 table 8. This field contains the value of 0000 hexadecimal. The Table Maintenance Program interprets this as the last record entered into the first client's Data Table.

The fourth field of this said record, is the POINTER PRVS DATE 36 as shown in column 6, line 3 table 8. This field holds a value of 9009 hexadecimal and it can be seen that it points to the second data entry record for the first client (line 2 table 8).

The fifth field of this client's third Data Table record is the DATE TIME 37 field as described in column 7, line 3 table 8. An encoded value representative of 061988 (date) and 1410 (time) is stored in this field by the present invention.

The sixth field of this client's third Data Table record is AMOUNT 38, as illustrated in column 8, line 3 table 8. A decimal value of 40.00 is stored in this field, which reflects the total billable amount for the first client's third task as entered in line 5 table 5. This is a per item calculated value, using the accumulated number of items, stored in the AMOUNT field, column 9 line 3 and the COST 31 value stored in the Task Table, record three, line 3 table 7.

The seventh and last field of this client's third Data Table record is the QUANTITY 39 field, as illustrated in column 9, line 3 table 8. This field contains a decimal value of 2.0 and reflects the total number of items used on this given task as entered in line 5 in table 5.

The first record entry into the Data Table, for a CLIENT CODE 20 of 2, is stored in a block of memory starting at hexadecimal address 9019 (column 1, line 4 table 8) and ends at hexadecimal address 9020 (column 2, line 4 table 8). The start address was calculated by the address hashing algorithm based upon the CLIENT CODE 20 of 2, a TASK CODE 28 of 1 and the DATE TIME 37 when the entry was made (column 7, line 4 table 8), as required in line 8 table 5.

The first field in this client's first Data Table record is the POINTER TASK DESC 33 as illustrated in column 3, line 4 table 8. This value was initialized to 605A hexadecimal. It can be seen that this said pointer points to the first record of this client in the Task Table, line 5 table 7. This field identifies the data in the record with the task in the Task Table, i.e. TASK CODE 28 of value 1.

The second field in this client's first Data Table record is the POINTER SAME TASK 34. As illustrated in column 4, line 4 table 8, this field holds a value of 0000 hexadecimal. The present embodiment of the invention interprets this value as that the current record is the only data record for the client's task pointed to, by the POINTER TASK DESC 33 field in column 3, line 4 table 8.

The third field in this client's first Data Table record is the POINTER NEXT DATE 35 as indicated in column 5, line 4 table 8. This field contains the value of 9021 hexadecimal. It can be seen in table 8, that this pointer points to the next entry in the Data Table for this client, i.e. line 5 table 8.

The fourth field of this said record, is the POINTER PRVS DATE 36 as shown in column 6, line 4 table 8. This field holds the value of 0000 hexadecimal. The Table Maintenance Program interprets this as the first record entered into the first client's Data Table.

The fifth field of this client's first Data Table record is the DATE TIME 37 field as described in column 7, line 4 table 8. An encoded value of 071988 (date) and 1900 (time) is stored in this field by the present invention.

The sixth field of this client's first Data Table record is AMOUNT 38, as illustrated in column 8, line 4 table 8. A decimal value of 45.00 is stored in this field, which reflects the total billable amount for the first client's first task as entered in line 8 table 5.

The seventh and last field of this client's first Data Table record is the QUANTITY 39 field, as illustrated in column 9, line 4 table 8. This field contains a value of 0, because of the nature of this record's task, as pointed to by the POINTER TASK DESC 33 in column 3, line 4 table 8.

The second record entry in the Task Table, for a CLIENT CODE 20 of 2, is stored in a block of memory starting at hexadecimal address 9021 (column 1, line 5 table 8) and ends at hexadecimal address 9028 (column 2, line 5 table 8). The start address was calculated by the address hashing algorithm based upon the CLIENT CODE 20 of 2, a TASK CODE 28 of 2 and the DATE TIME 37 when the entry was made (column 7, line 5 table 8), as required in line 8 table 5.

The first field in this client's second Data Table record is the POINTER TASK DESC 33 as illustrated in column 3, line 5 table 8. This value was initialized to 6078 hexadecimal. It can be seen that this said pointer points to the second record of this client in the Task Table, line 6 table 7. This field identifies the data in the record with this task in the Task Table, i.e. TASK CODE 28 of value 2.

The second field in this client's second Data Table record is the POINTER SAME TASK 34. As illustrated in column 4, line 5 table 8, this field holds a value of 0000 hexadecimal. The present embodiment of the invention interprets this value as that the current record is the only data record for the client's task pointed to, by the POINTER TASK DESC 33 field in column 3, line 5 table 8.

The third field in this client's second Data Table record is the POINTER NEXT DATE 35 as indicated in column 5, line 5 table 8. This field contains the value of 0000 hexadecimal. The Table Maintenance Program interprets this as the last record entered into the second client's Data Table.

The fourth field of this said record, is the POINTER PRVS DATE 36 as shown in column 6, line 5 table 8. This field holds a value of 9019 hexadecimal and it can be seen that it points to the first data entry record for the second client (line 4 table 8).

The first field of this client's second Data Table record is the DATE TIME 37 field as described in column 7, line 5 table 8. An encoded value representative of 071988 (date) and 1930 (time) is stored in this field by the present invention.

The sixth field of this client's second Data Table record is AMOUNT 38, as illustrated in column 8, line 5 table 8. A decimal value of 27.50 is stored in this field, which reflects the total billable amount for the first client's second task as entered in line 10 table 5. This is a per hour calculated value, using the accumulated billable time stored in the AMOUNT field, column 9 line 5 and the COST 31 value stored in the Task Table, record two, line 6 table 7.

The seventh and last field of this client's second Data Table record is the QUANTITY 39 field, as illustrated in column 9, line 5 table 8. This field contains a decimal value of 0.5 and reflects the total time spent on this given task as entered in lines 9 and 10 in table 5.

The invention being thus described, it will be obvious that the same may be varied in a multiplicity of ways. Such variations are not to be regarded as a departure from the spirit and scope of the invention, and all such modifications are intended to be included within the scope of the following claims,

What is claimed is:

1. An electronic hand-held memory device comprising:
   input means for introducing alphanumeric data into said device, said alphanumeric data comprising of transaction descriptions, transacted data, label codes each representative of the leading address of a particular transaction description, said transaction description comprising of transaction unit costs, actual total costs of the said transaction and the quantity of the said transacted items;
   memory means responsive to said input means for storing a plurality of transaction description data and transacted data that are logically linked together, but separately stored in said memory by means of said label code;
   memory means responsive to said input means for storing a plurality of non-transaction data;
   time keeping circuitry means for keeping actual constant time;
   output display means to display desired transaction description data and transacted data, accessed by means of said transaction label codes, introduced by said input means;
   computing means responsive to said transaction label codes corresponding to desired transaction data to sum together the said transaction numeric data stored in association therewith to form information representative of the sum of said numeric data;
   computing means responsive to said transaction label codes corresponding to desired transaction data for multiplying or dividing the said transaction numeric data stored in association therewith to form arithmetic information representative of the arithmetic division or multiplication of the said numeric data by a constant arithmetic value, said constant arithmetic value introduced by said input means;
   control means to label said transacted data, by said time keeping circuitry means, with a time stamp label, such that said transacted data is uniquely defined within said memory means, by means of combining said time stamp label together with said transaction label code;
   interface means for the bi-directional transfer of said transaction description data, said transaction label codes and said transacted data between the said device and an remote electronic device.

2. The device in claim 1 comprising of the means to retrieve said transaction description data by said transaction label code in combination with said time stamp label, to display said retrieved data on said output display means.

3. The device of claim 2 comprising of computing means responsive to said transaction label code in combination with said time stamp label, for accessing desired transaction data and multiplying or dividing the said transaction numeric data to form arithmetic information representative of the arithmetic division or multiplication of the said numeric data by a constant arithmetic value.

4. The device of claim 3 comprising of the control means to record and store the time spent on a said transaction, which is actuated and terminated by said input means, and providing the means for computing said transaction total cost by means of multiplying said accumulated time data by said transaction unit cost.

5. The device in claim 4 comprising of the means to retrieve and edit said transaction description data and said transacted numeric data.

6. The device in claim 5 comprising of the means to retrieve and delete said transaction description data and said transacted numeric data.

7. The device in claim 6 comprising of the means to retrieve and transmit said transaction description data, said transaction label codes and said transacted numeric data to and from a remote electronic device.

* * * * *